(12) United States Patent
Jha

(10) Patent No.: US 10,055,225 B2
(45) Date of Patent: Aug. 21, 2018

(54) MULTI-REGISTER SCATTER INSTRUCTION

(75) Inventor: Ashish Jha, Portland, OR (US)

(73) Assignee: Intel Corporation, Santa Clara, CA (US)

(*) Notice: Subject to any disclaimer, the term of this patent is extended or adjusted under 35 U.S.C. 154(b) by 375 days.

(21) Appl. No.: 13/995,433

(22) PCT Filed: Dec. 23, 2011

(86) PCT No.: PCT/US2011/067276

§ 371 (c)(1),
(2), (4) Date: Jun. 18, 2013

(87) PCT Pub. No.: WO2013/095669

PCT Pub. Date: Jun. 27, 2013

(65) Prior Publication Data

US 2014/0108769 A1    Apr. 17, 2014

(51) Int. Cl.
*G06F 9/30* (2018.01)

(52) U.S. Cl.
CPC ...... *G06F 9/30098* (2013.01); *G06F 9/30032* (2013.01); *G06F 9/30036* (2013.01)

(58) Field of Classification Search
CPC .................................................. G06F 9/30098
See application file for complete search history.

(56) References Cited

U.S. PATENT DOCUMENTS

| 2002/0007449 A1 | 1/2002 | Koyanagi |
| 2004/0236920 A1 | 11/2004 | Sheaffer |
| 2009/0249026 A1* | 10/2009 | Smelyanskiy ...... G06F 9/30032 712/4 |
| 2011/0138155 A1 | 6/2011 | Kawaguchi |
| 2011/0153983 A1 | 6/2011 | Hughes et al. |
| 2012/0166761 A1* | 6/2012 | Hughes ............... G06F 9/30018 712/7 |

(Continued)

FOREIGN PATENT DOCUMENTS

| CN | 102103483 A | 6/2011 |
| TW | 201140434 A1 | 11/2011 |

OTHER PUBLICATIONS

PCT International Search Report for PCT Counterpart Application No. PCT/US2011/067276, 3 pgs., (dated Aug. 24, 2012).

(Continued)

*Primary Examiner* — John Lindlof
(74) *Attorney, Agent, or Firm* — Nicholson De Vos Webster & Elliott LLP

(57) ABSTRACT

A processor fetches a multi-register scatter instruction that includes a source operand and a destination operand. The source operand specifies a source vector register that includes multiple source data elements. The destination operand identifies multiple destination data elements that each specify a destination vector register and an index into that destination vector register. The instruction is decoded and executed, causing, for each of those identified destination data elements, the one of the source data elements that is in a position in the source vector register that corresponds with a position of that destination data element to be stored in the destination vector register at the index specified by that destination data element.

20 Claims, 24 Drawing Sheets

(56) References Cited

U.S. PATENT DOCUMENTS

2012/0254591 A1* 10/2012 Hughes .............. G06F 9/30018
712/205

OTHER PUBLICATIONS

PCT Written Opinion of the International Searching Authority for PCT Counterpart Application No. PCT/US2011/067276, 4 pgs., (dated Aug. 24, 2012).
PCT Notification concerning Transmittal of International Preliminary Report on Patentability (Chapter I of the Patent Cooperation Treaty) for PCT Counterpart Application No. PCT/US2011/067276, 6 pgs., (dated Jun. 24, 2014).
Office Action from counterpart Chinese Patent Application No. 201180076436.3 dated Apr. 6, 2016, 9 pages.
Office Action and Search Report from counterpart Taiwan Patent Application No. 101147188 dated Sep. 12, 2014, 18 pages.
Office action with summarized English translation from Chinese Patent Application No. 201180076436.3, dated Nov. 28, 2016, 15 pages.
Office action with summarized English translation from Chinese Patent Application No. 201180076436.3, dated Jun. 2, 2017, 15 pages.

* cited by examiner

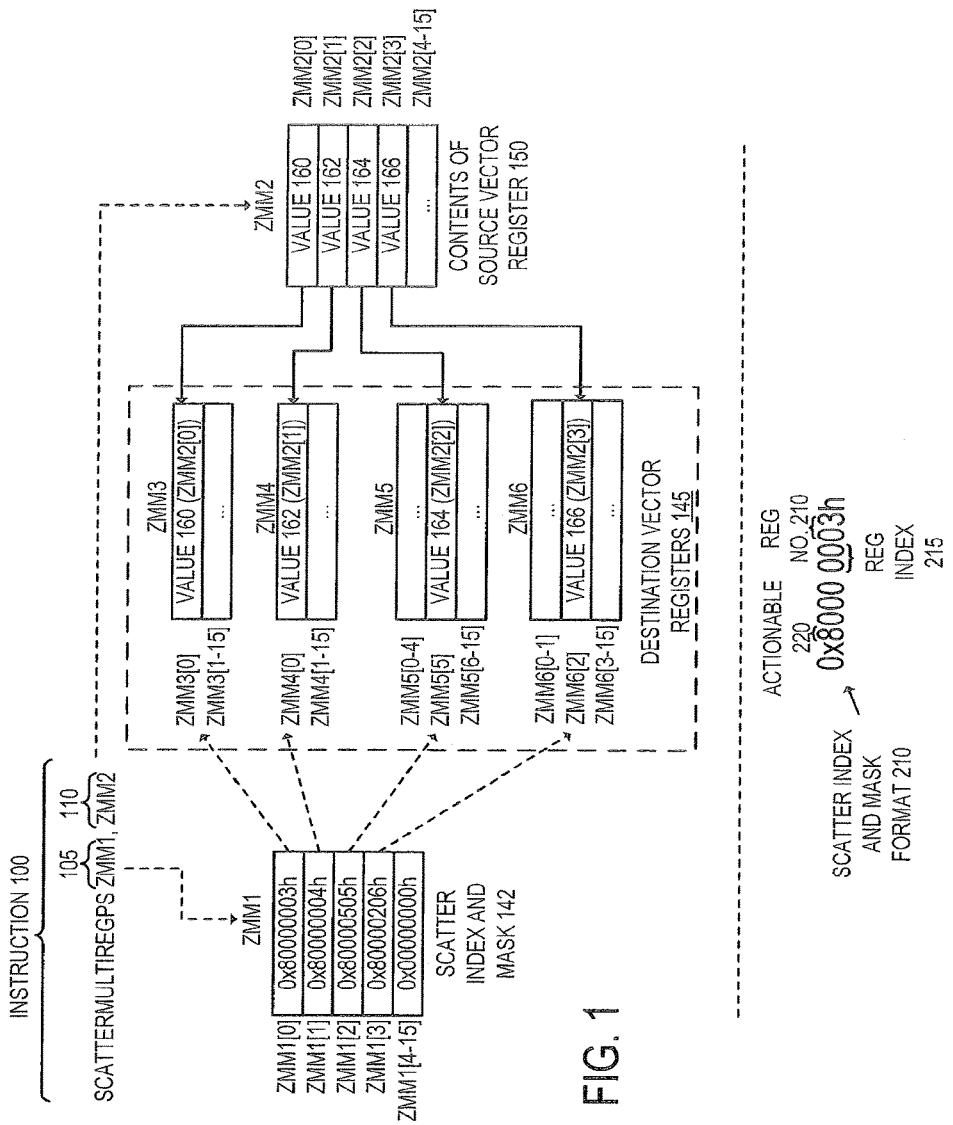

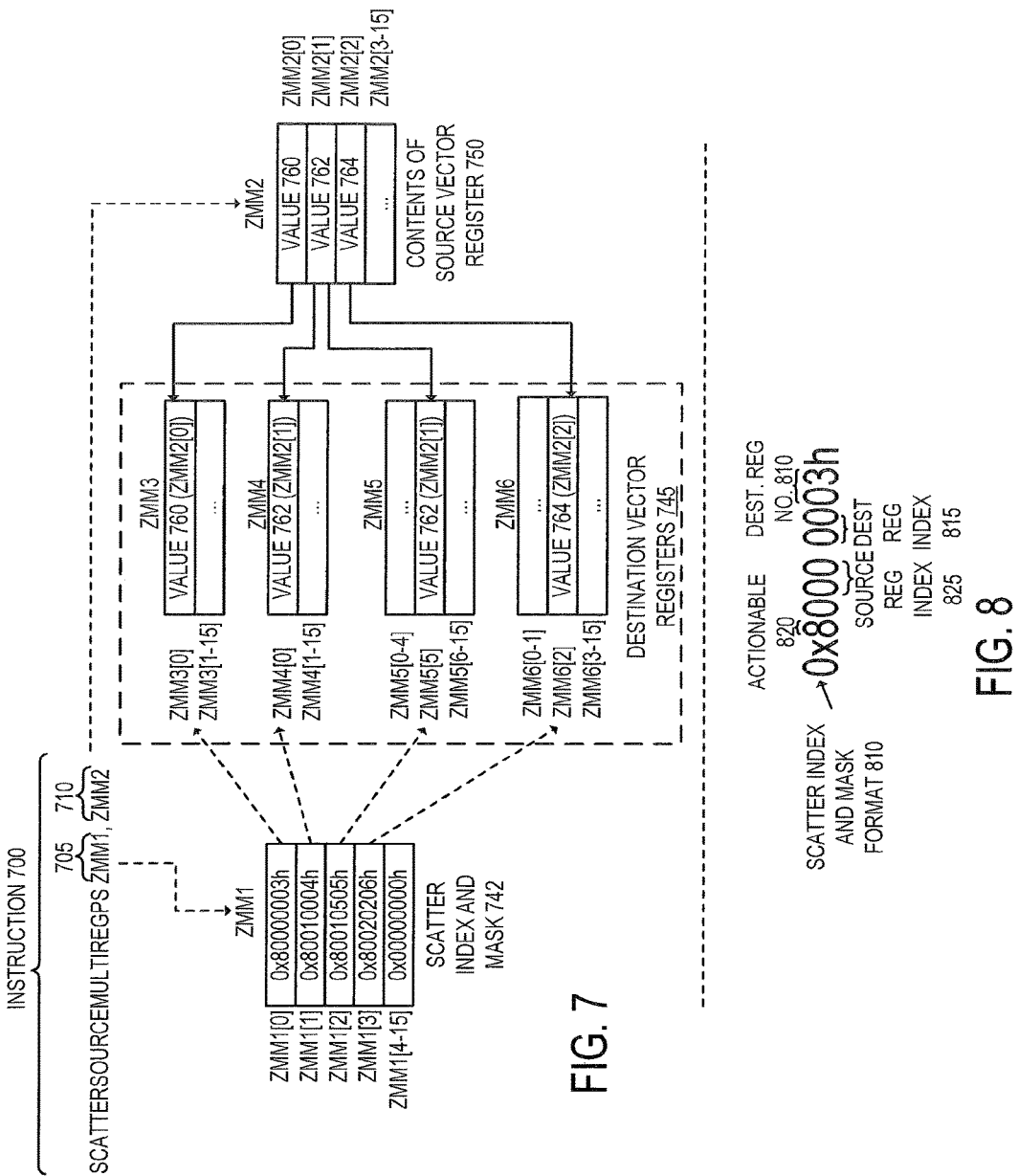

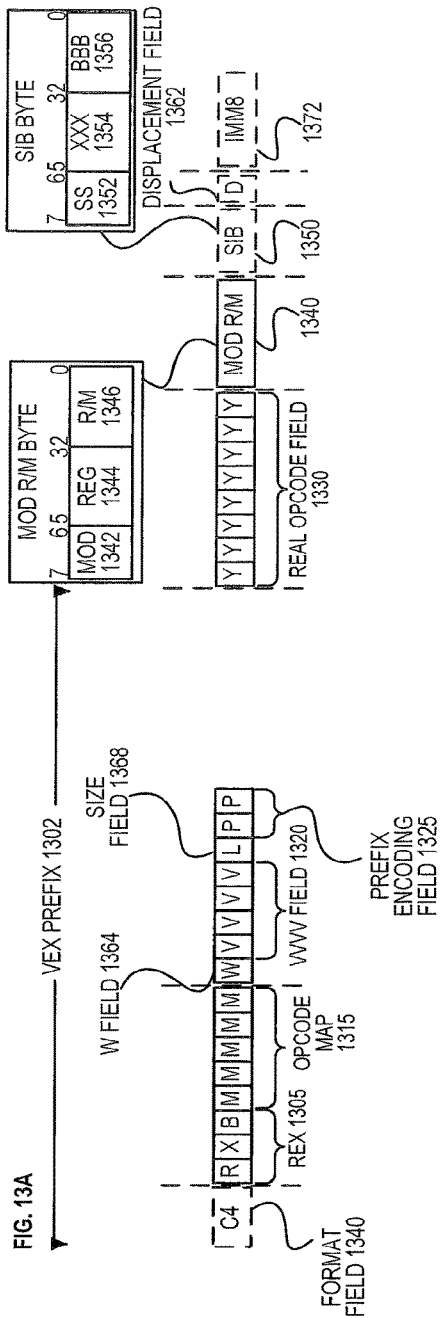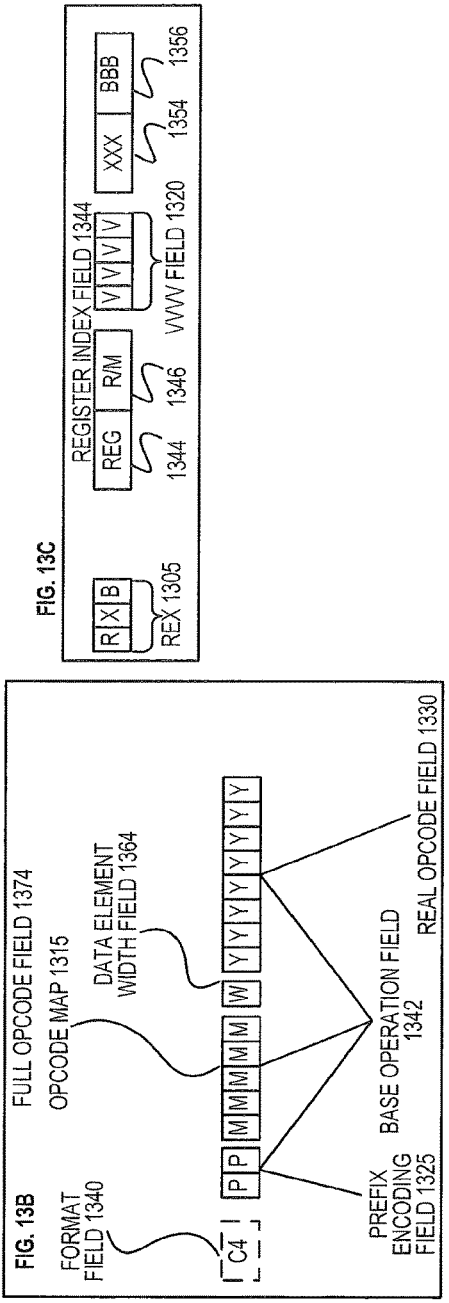

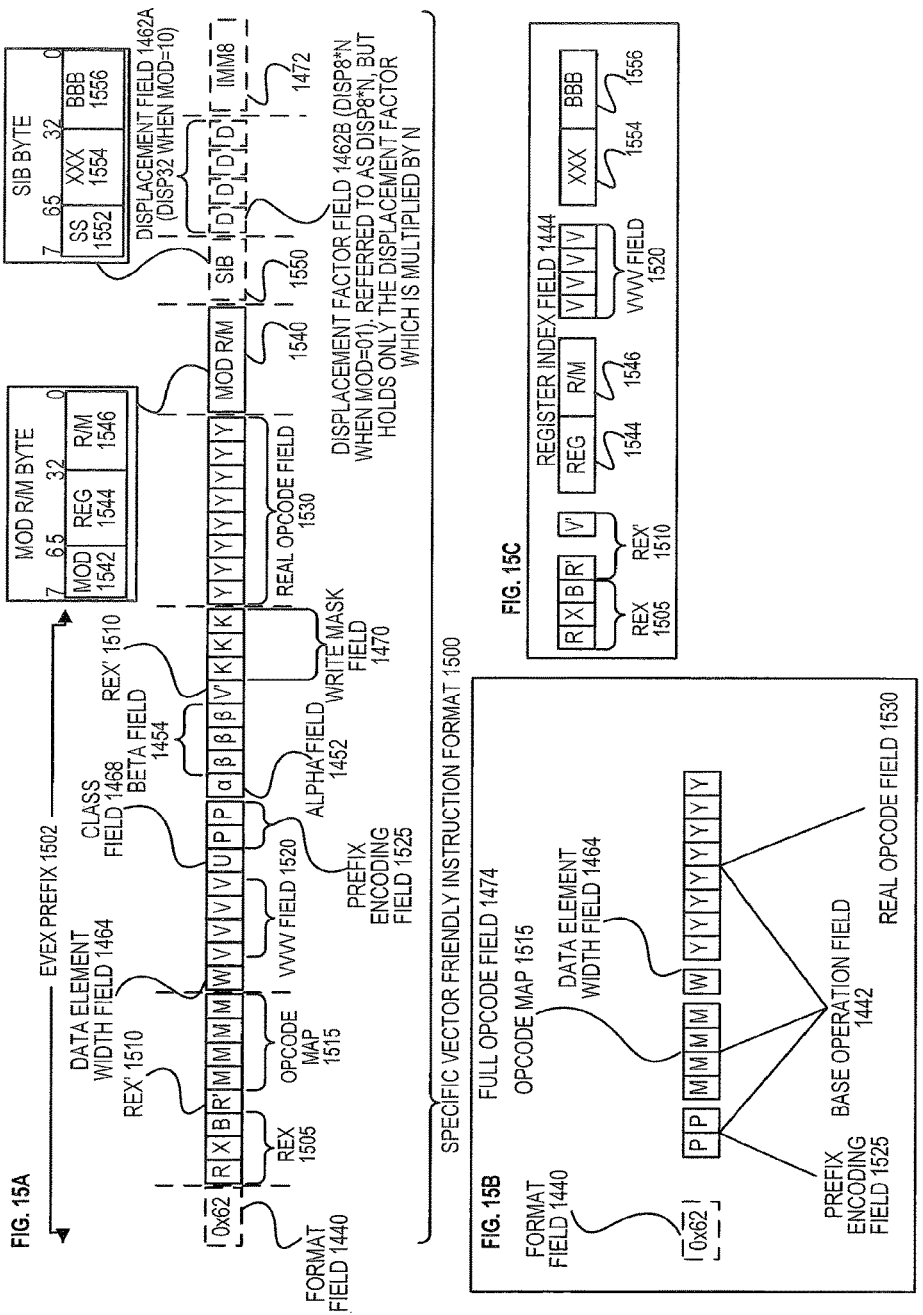

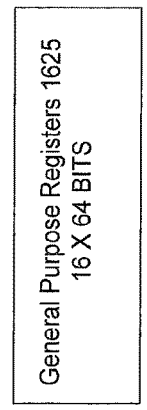
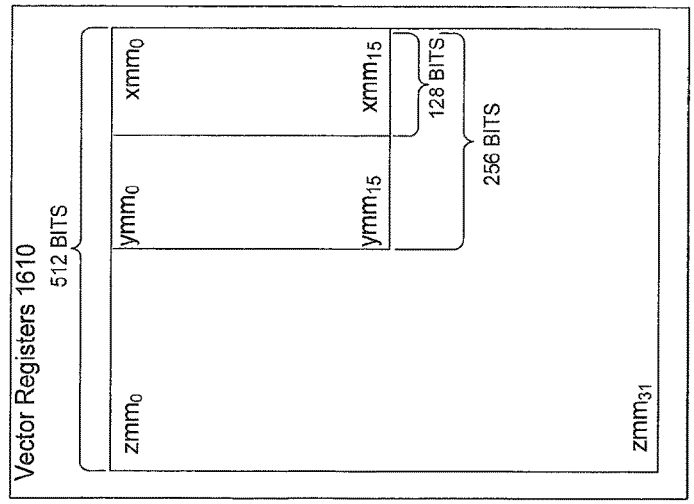
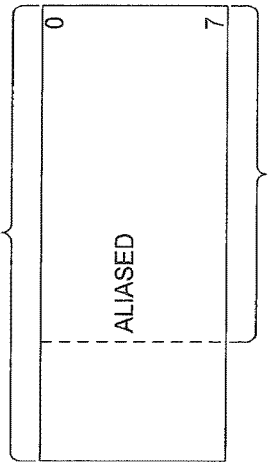
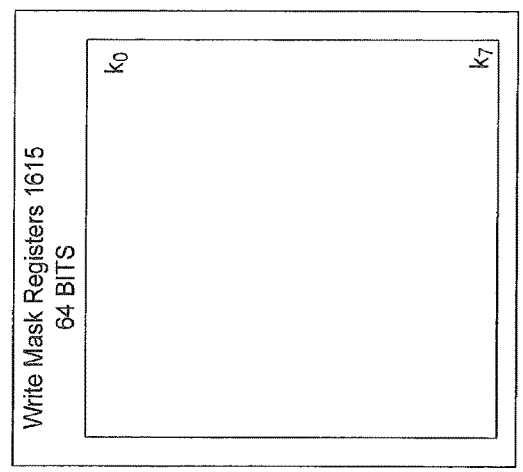
FIG. 16

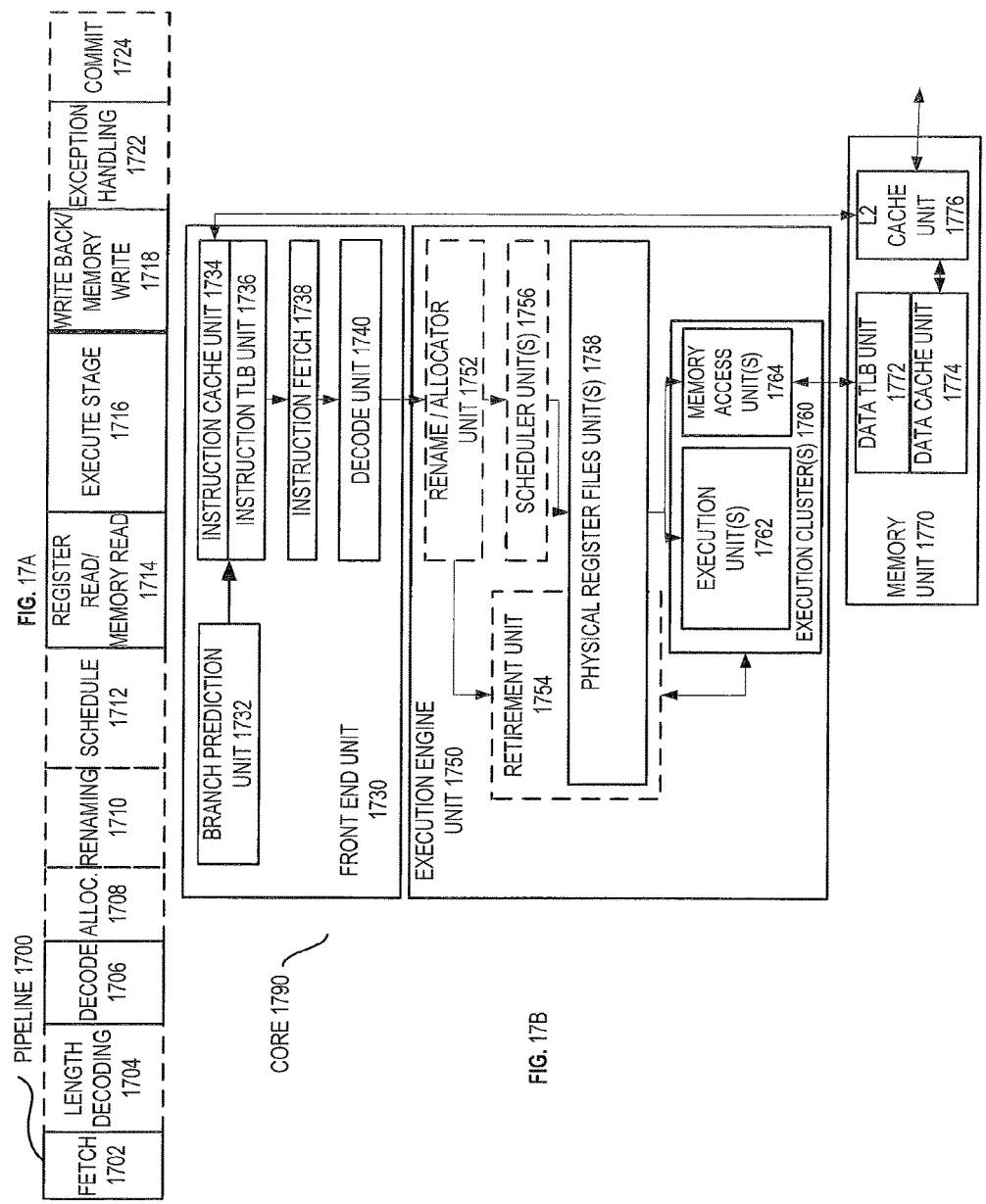

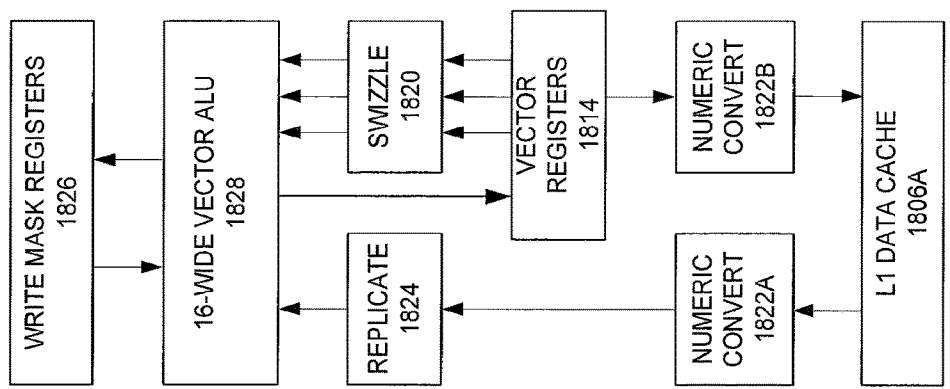
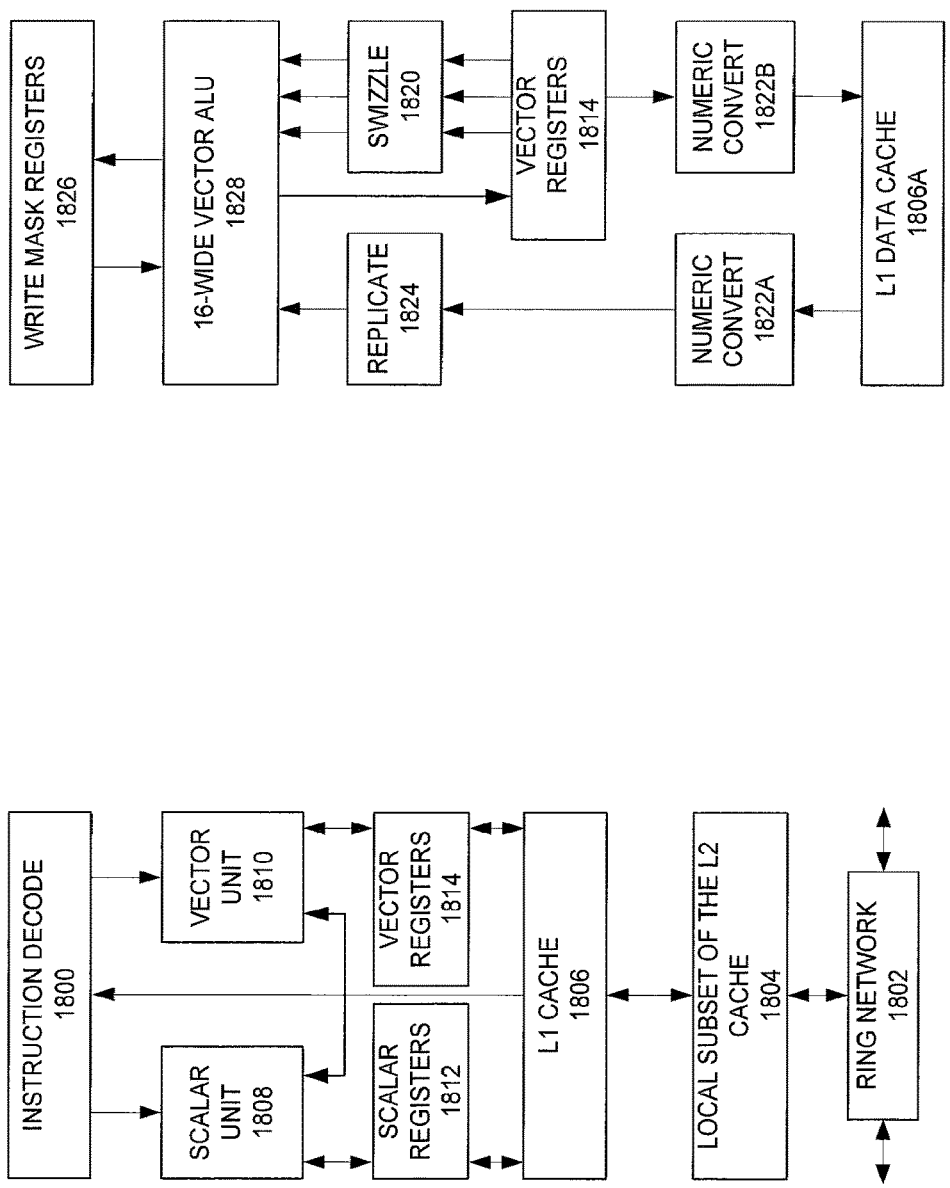

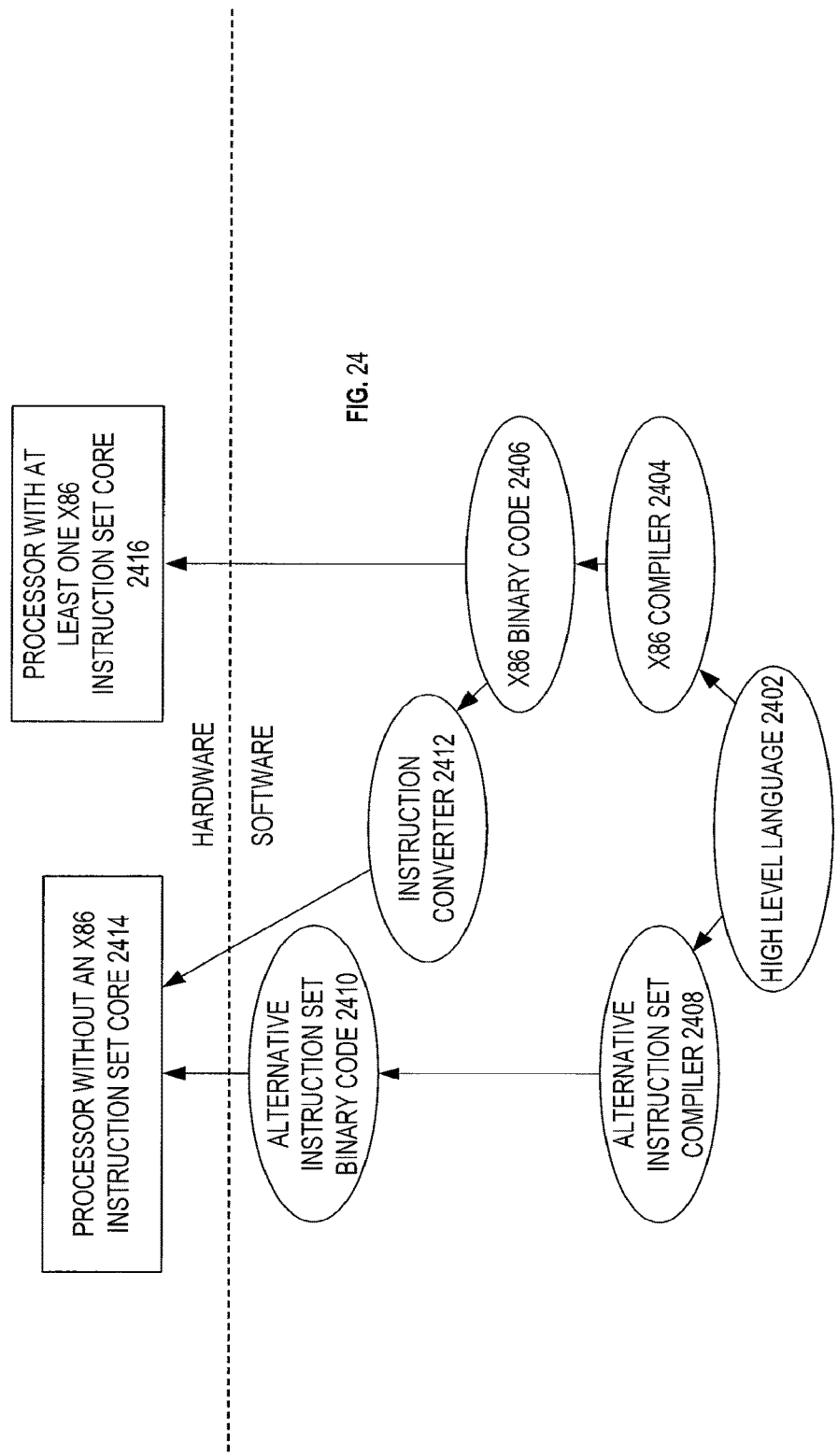

MULTI-REGISTER SCATTER INSTRUCTION

CROSS-REFERENCE TO RELATED APPLICATIONS

This patent application is a U.S. National Phase Application under 35 U.S.C. § 371 of International Application No. PCT/US2011/067276, filed Dec. 23, 2011, entitled MULTI-REGISTER SCATTER INSTRUCTION.

FIELD OF INVENTION

The field of invention relates generally to computer processor architecture, and, more specifically, to a multi-register scatter instruction.

BACKGROUND

An instruction set, or instruction set architecture (ISA), is the part of the computer architecture related to programming, and may include the native data types, instructions, register architecture, addressing modes, memory architecture, interrupt and exception handling, and external input and output (I/O). It should be noted that the term instruction generally refers herein to a macro-instruction—that is instructions that are provided to the processor for execution—as opposed to micro-instructions or micro-ops—that result from a processor's decoder decoding macro-instructions). The instruction set architecture is distinguished from the microarchitecture, which is the internal design of the processor implementing the ISA. Processors with different microarchitectures can share a common instruction set.

An instruction set includes one or more instruction formats. A given instruction format defines various fields (number of bits, location of bits) to specify, among other things, the operation to be performed and the operand(s) on which that operation is to be performed. A given instruction is expressed using a given instruction format and specifies the operation and the operands. An instruction stream is a specific sequence of instructions, where each instruction in the sequence is an occurrence of an instruction in an instruction format.

Scientific, financial, auto-vectorized general purpose, RMS (recognition, mining, and synthesis)/visual and multimedia applications (e.g., 2D/3D graphics, image processing, video compression/decompression, voice recognition algorithms and audio manipulation) often require the same operation to be performed on a large number of data items (referred to as "data parallelism"). Single Instruction Multiple Data (SIMD) refers to a type of instruction that causes a processor to perform the same operation on multiple data items. SIMD technology is especially suited to processors that can logically divide the bits in a register into a number of fixed-sized data elements, each of which represents a separate value. For example, the bits in a 64-bit register may be specified as a source operand to be operated on as four separate 16-bit data elements, each of which represents a separate 16-bit value. As another example, the bits in a 256-bit register may be specified as a source operand to be operated on as four separate 64-bit packed data elements (quad-word (Q) size data elements), eight separate 32-bit packed data elements (double word (D) size data elements), sixteen separate 16-bit packed data elements (word (W) size data elements), or thirty-two separate 8-bit data elements (byte (B) size data elements). This type of data is referred to as the packed data type or vector data type, and operands of this data type are referred to as packed data operands or vector operands. In other words, a packed data item or vector refers to a sequence of packed data elements; and a packed data operand or a vector operand is a source or destination operand of a SIMD instruction (also known as a packed data instruction or a vector instruction).

By way of example, one type of SIMD instruction specifies a single vector operation to be performed on two source vector operands in a vertical fashion to generate a destination vector operand (also referred to as a result vector operand) of the same size, with the same number of data elements, and in the same data element order. The data elements in the source vector operands are referred to as source data elements, while the data elements in the destination vector operand are referred to a destination or result data elements. These source vector operands are of the same size and contain data elements of the same width, and thus they contain the same number of data elements. The source data elements in the same bit positions in the two source vector operands form pairs of data elements (also referred to as corresponding data elements; that is, the data element in data element position 0 of each source operand correspond, the data element in data element position 1 of each source operand correspond, and so on). The operation specified by that SIMD instruction is performed separately on each of these pairs of source data elements to generate a matching number of result data elements, and thus each pair of source data elements has a corresponding result data element. Since the operation is vertical and since the result vector operand is the same size, has the same number of data elements, and the result data elements are stored in the same data element order as the source vector operands, the result data elements are in the same bit positions of the result vector operand as their corresponding pair of source data elements in the source vector operands. In addition to this exemplary type of SIMD instruction, there are a variety of other types of SIMD instructions (e.g., that have only one or has more than two source vector operands; that operate in a horizontal fashion; that generate a result vector operand that is of a different size, that have a different size of data elements, and/or that have a different data element order). It should be understood that the term destination vector operand (or destination operand) is defined as the direct result of performing the operation specified by an instruction, including the storage of that destination operand at a location (be it a register or at a memory address specified by that instruction) so that it may be accessed as a source operand by another instruction (by specification of that same location by the another instruction.

Certain instruction set architectures allow multiple vector and scalar operations to complete in parallel and update the instruction set architecture register set. There are operations where once the value is computed in a vector register, its elements are to be scattered across different vector registers. Traditionally, scatter operations are performed using long and dependent chain of permutes and shuffles across different register sets, which is expensive and complex.

BRIEF DESCRIPTION OF THE DRAWINGS

The present invention is illustrated by way of example and not limitation in the figures of the accompanying drawings, in which like references indicate similar elements and in which:

FIG. 1 illustrates an exemplary execution of a multiple-register scatter instruction according to one embodiment;

FIG. 2 illustrates an exemplary scatter index and mask value format according to one embodiment;

FIG. 7 illustrates an exemplary execution of a multiple-register scatter instruction according to one embodiment;

FIG. 8 illustrates an exemplary scatter index and mask value format according to one embodiment;

FIG. 13a illustrates an exemplary AVX instruction format including a VEX prefix, real opcode field, Mod RIM byte, SIB byte, displacement field, and IMM8 according to one embodiment;

FIG. 13B illustrates which fields from FIG. 13A make up a full opcode field and a base operation field according to one embodiment;

FIG. 13C illustrates which fields from FIG. 13A make up a register index field according to one embodiment;

FIG. 15A is a block diagram illustrating an exemplary specific vector friendly instruction format according to embodiments of the invention;

FIG. 15B is a block diagram illustrating the fields of the specific vector friendly instruction format of FIG. 15a that make up the full opcode field according to one embodiment of the invention;

FIG. 15C is a block diagram illustrating the fields of the specific vector friendly instruction format that make up the register index field according to one embodiment of the invention;

FIG. 16 is a block diagram of a register architecture according to one embodiment of the invention;

FIG. 17A is a block diagram illustrating both an exemplary in-order pipeline and an exemplary register renaming, out-of-order issue/execution pipeline according to embodiments of the invention;

FIG. 17B is a block diagram illustrating both an exemplary embodiment of an in-order architecture core and an exemplary register renaming, out-of-order issue/execution architecture core to be included in a processor according to embodiments of the invention;

FIG. 18A is a block diagram of a single processor core, along with its connection to the on-die interconnect network and with its local subset of the Level 2 (L2) cache, according to embodiments of the invention;

FIG. 18B is an expanded view of part of the processor core in FIG. 18A according to embodiments of the invention;

FIG. 24 is a block diagram contrasting the use of a software instruction converter to convert binary instructions in a source instruction set to binary instructions in a target instruction set according to embodiments of the invention.

DETAILED DESCRIPTION

Figure 3:
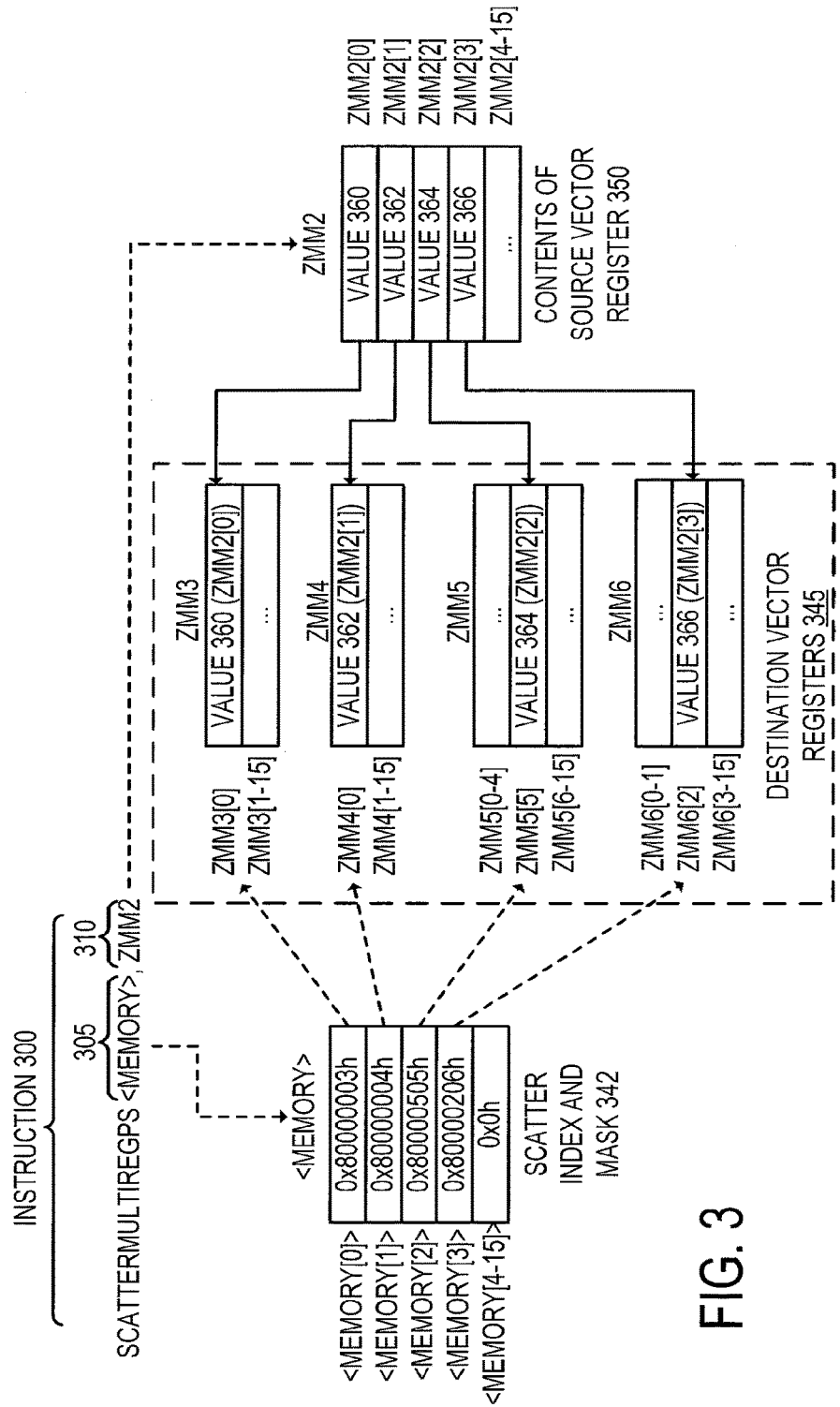
FIG. 3 illustrates another exemplary execution of a multiple-register scatter instruction according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As detailed earlier, a scatter operation to scatter a computed value in a vector register was traditionally performed using a complex and long dependent chain of permutes and shuffles, which is proportional to the number of destination registers, and is time consuming for the programmer or compiler and results in long instruction sequences.

Embodiments of a multi-register scatter instruction (ScatterMultiReg) are detailed below and embodiments of systems, architectures, instruction formats etc. that may be used to execute such an instruction. The multi-register scatter instruction includes a source operand and a destination operand. The source operand specifies a source vector register that includes multiple source data elements that are to be stored in multiple destination vector registers. The destination operand identifies multiple destination data elements, each of which specifies a destination vector register and an index into that destination vector register. When executed, the multi-register scatter instruction causes a processor to store multiple data elements from a single source vector register to multiple destination vector registers.

In some embodiments, the destination operand specifies a vector register that identifies the destination data elements. In other embodiments, the destination operand specifies a memory location that identifies the destination data elements.

One example of this instruction is "ScatterMultiReg[PS/PD] zmm1, zmm2" where zmm1 and zmm2 are vector registers (such as 128-, 256-, 512-bit registers). The vector register zmm2 includes multiple source data elements (e.g., 16 data elements assuming each data element is 32 bits and zmm2 is a 512-bit register), of which at least some of them will be stored in destination vector registers according to the content of the vector register zmm1. The vector register zmm1 includes multiple data elements, each of which may specify another vector register and an index into that vector register that will store the data element of the vector register zmm2 that is in a corresponding position as the data element of vector register zmm1 when the instruction is executed. The "PS" portion of the instruction indicates a scalar floating point (4 bytes), whereas the "PD" portion of the instruction indicates a double floating point (8 bytes). Another example of the multiple-register scatter instruction for an integer vector form may also be used in embodiments such as "ScatterMultiReg[D/Q] zmm1, zmm2" that scatters a packed DWORD or QWORD integer elements.

Another example of this instruction is "ScatterMultiReg[PS/PD]<memory>, zmm2" where <memory> is a location in memory and zmm2 is a vector register (such as a 128-, 256-, 512-bit register). The vector register zmm2 includes multiple source data elements (e.g., 16 data elements assuming each data element is 32 bits and zmm2 is a 512-bit register), of which at least some of them will be stored in destination vector registers according to the content of the memory location <memory>. The memory location <memory> identifies multiple data elements, each of which may specify a vector register and an index into that vector register that will store the data element of the vector register zmm2. The "PS" portion of the instruction indicates a scalar floating point (4 bytes), whereas the "PD" portion of the instruction indicates a double floating point (8 bytes). Another example of the multiple-register scatter instruction for an integer vector form may also be used in embodiments such as "ScatterMultiReg[D/Q]<memory>, zmm2" that scatters a packed DWORD or QWORD integer elements.

FIG. 1 illustrates an exemplary execution of a multiple-register scatter instruction according to one embodiment. The multiple-register scatter instruction 100 includes a destination operand 105 and a source operand 110. The multiple-register scatter instruction 100 belongs to an instruction set architecture, and each "occurrence" of the instruction 100 within an instruction stream would include values within the destination operand 105 and the source operand 110. In this example, both the destination operand 105 and the source operand 110 are vector registers (such as 128-, 256-, 512-bit registers). The vector registers may be zmm registers with 16 32-bit data elements, however, other data element and register sizes may be used such as xmm or ymm registers and 16- or 64-bit data elements.

The contents 150 of the source vector register specified by the source operand (zmm2 as illustrated) include multiple source data elements. As illustrated in FIG. 1, the source data element at index 0 of zmm2 contains the value 160, the source data element at index 1 of zmm2 contains the value 162, the source data element at index 2 of zmm2 contains the value 164, and the source data element at index 3 of zmm2 contains the value 166. The source data elements at indexes 4-15 of zmm2 also contain values; however they are not illustrated in FIG. 1 because they will not be scattered as a result of the contents of zmm1, which will be described in greater detail below.

The vector register zmm1 includes multiple data elements, each of may specify a scatter index and mask value 142. Each scatter index and mask value 142 may specify a destination vector register and an index into that vector register, and may further specify whether the source data element that is in a position of the register zmm2 that corresponds with the position of the data element is to be stored in the specified destination vector register. For a scalar floating point (PS), each scatter index and mask value 142 is 4 bytes (32 bits). In some embodiments, the lower 16-bits are used to represent the number of the vector register and an index into that vector register, and the most significant bit indicates whether to take action (whether the source data element that is in a corresponding position as the scatter index and mask value is to be copied into the specified vector register at the specified index). Thus, the data elements of the vector register specified by the destination operand 105 indicate the destination vector registers 145 and an index into those registers.

FIG. 2 illustrates an exemplary scatter index and mask value format 210. The lower 8-bits of the scatter index and mask format 210 indicates the vector register number 210. The next upper 8-bits represents the register index 215. The most significant bit is an actionable bit 210 that indicates whether to take action (whether to store the source that is in a corresponding position in the source vector register as the scatter index and mask value at the destination data element identified by the register index 215 of the register identified by the register number 210.

For example, using the scatter index and mask value format illustrated in FIG. 2, the data element identified at index 0 of the zmm1 register has the scatter index and mask value (in hexadecimal notation) 0x80000003h, which represents the vector register 3 (e.g., zmm3) and its index 0, and is actionable. The data element identified at index 1 of the zmm1 vector register has the scatter index and mask value (in hexadecimal notation) 0x80000004h, which represents the vector register 4 (e.g., zmm4) and its index 0, and is actionable. The data element identified at index 2 of the zmm1 vector register has the scatter index and mask value 0x80000505h, which represents the vector register 5 (e.g., zmm5) and its index 5, and is actionable. The data element identified at index 3 of the zmm1 vector register has the scatter index and mask value 0x800000206h, which represents the vector register 6 (e.g., zmm6) and its index 2, and is actionable. The data elements identified at indexes 4-15 of the zmm1 vector register each have the scatter index and mask value 0x00000000h, which represents the vector register 0 (e.g., zmm0) and its index 0, and is not actionable (meaning that the elements in the indexes 4-15 of the source vector register zmm2 will not be scattered).

The selection of which bits represent the vector register number and which bits represent the index of that vector register can be chosen differently in different embodiments. For example, the lower 16-bits may represent the vector register number, and the upper 16-bits may form the register index, which allows for future ISA expansion. In such a case, the instruction may also include a mask register that indicates whether it is actionable.

In some embodiments, the source data element of the vector register specified by the source operand that is in a corresponding position as the value of the scatter index and mask value is stored in the vector register identified by the scatter index and mask value at the index identified by the scatter index and mask value as a result of the instruction executing (assuming that the scatter index and mask value indicates it is actionable). For example, in such an embodiment, since the scatter index and mask value of the data element zmm1[0] (index 0 of the zmm1 register) is 0x80000003h, the value 160 (which is the value of the source data element at the vector register specified by the source operand 110 (zmm2[0]) that is in the same position as the scatter index and mask value) is stored in the destination data element at index 0 of the vector register zmm3 (zmm3[0]) as a result of the instruction executing.

As illustrated in FIG. 1, as indicated by the scatter index and mask value of zmm1[0], the value 160, which is the value of the source data element at zmm2[0], is stored in the data element at zmm3[0] as a result of the instruction executing. As indicated by the scatter index and mask value of zmm1[1], the value 162, which is the value of the source data element at zmm2[1], is stored in the data element at zmm4[0] as a result of the instruction executing. As indicated by the scatter index and mask value of zmm1[2], the value 164, which is the value of the source data element at zmm2[2], is stored in the data element at zmm5[5], as a result of the instruction executing. As indicated by the scatter index and mask value of zmm1[3], the value 166, which is the value of the source data element at zmm2[3], is stored in the data element at zmm6[2], as a result of the instruction executing. Since the scatter index and mask value of each of the data elements at zmm1[4-15] indicate to take no action, the source data elements at zmm2[4-15] will not be stored in destination data elements as a result of the instruction executing.

Thus, after an occurrence of the instruction 100 being executed, the value 160 from zmm2[0] is stored in zmm3[0] (the data elements zmm3[1-15] are not changed as a result of the execution of the instruction 100), the value 162 from zmm2[1] is stored in zmm4[0] (the data elements zmm4[1-15] are not changed as a result of the execution of the instruction 100), the value 164 from zmm2[2] is stored in zmm5[5] (the data elements zmm5[0-4] and zmm5[6-15] are not changed as a result of the execution of instruction 100), and the value 166 from zmm2[3] is stored in zmm6[2] (the data elements zmm6[0-1] and zmm6[3-15] are not changed as a result of the execution of instruction 100).

FIG. 3 illustrates another exemplary execution of a multiple-register scatter instruction. The multiple-register scatter instruction 300 includes a destination operand 305 and a source operand 310. The multiple-register scatter instruction 300 belongs to an instruction set architecture, and each "occurrence" of the instruction 300 within an instruction stream would include values within the destination operand 305 and the source operand 310. In this example, the source operand 310 is a vector register (such as a 128-, 256-, 512-bit register) and the destination operand 305 is a location in memory that identifies multiple destination data elements each of which may specify a scatter index and mask value 142, which may specify a destination vector register and an index into that vector register, and may further specify whether the source data element that is in a position of the register zmm2 that corresponds with the position of the data element is to be stored in the specified destination vector register. In one embodiment, the format of each scatter index and mask value 342 is the same as described with respect to FIGS. 1 and 2.

The contents 350 of the source vector register specified by the source operand (zmm2 as illustrated) include multiple source data elements. As illustrated in FIG. 3, the source data element at index 0 of zmm2 contains the value 360, the source data element at index 1 of zmm2 contains the value 362, the source data element at index 2 of zmm2 contains the value 364, and the source data element at index 3 of zmm2 contains the value 366. The source data elements at indexes 4-15 of zmm2 also contain values; however they are not illustrated in FIG. 3 because they will not be scattered as a result of the contents of the memory location specified by the destination operand 305, which will be described in greater detail below.

Using the scatter index and mask value format illustrated in FIG. 2, the data element identified at index 0 of the memory location specified by the operand 305 has the scatter index and mask value (in hexadecimal notation) 0x80000003h, which represents the vector register 3 (e.g., zmm3) and its index 0, and is actionable. The data element identified at index 1 of the memory location specified by the operand 305 has the scatter index and mask value (in hexadecimal notation) 0x80000004h, which represents the vector register 4 (e.g., zmm4) and its index 0, and is actionable. The data element identified at index 2 of the memory location specified by the operand 305 has the scatter index and mask value 0x80000505h, which represents the vector register 5 (e.g., zmm5) and its index 5, and is actionable. The data element identified at index 3 of the memory location specified by the operand 305 has the scatter index and mask value 0x800000206h, which represents the vector register 6 (e.g., zmm6) and its index 2, and is actionable. The data elements identified at indexes 4-15 of the memory location specified by the operand 305 each have the scatter index and mask value 0x0h, which indicates that the elements in the indexes 4-15 of the source vector register zmm2 will not be scattered.

As illustrated in FIG. 3, as indicated by the scatter index and mask value of index 0 of the memory location specified by the operand 305, the value 360, which is the value of the source data element at zmm2[0], is stored in the data element at zmm3[0] as a result of the instruction executing. As indicated by the scatter index and mask value of index 1 of the memory location specified by the operand 305, the value 362, which is the value of the source data element at zmm2[1], is stored in the data element at zmm4[0] as a result of the instruction executing. As indicated by the scatter index and mask value of index 2 of the memory location specified by the operand 305, the value 364, which is the value of the source data element at zmm2[2], is stored in the data element at zmm5[5], as a result of the instruction executing. As indicated by the scatter index and mask value of index 3 of the memory location specified by the operand 305, the value 366, which is the value of the source data element at zmm2[3], is stored in the data element at zmm6[2], as a result of the instruction executing. Since the scatter index and mask value of each of the data elements indexes 4-15 of the memory location specified by the operand 305 indicate to take no action, the source data elements at zmm2[4-15] will not be stored in destination data elements as a result of the instruction executing.

Thus, the multi-register scatter instruction scatters different source data elements from single vector register to data elements of multiple vector registers with a single instruction. In some embodiments, accesses are optimized such that when in a particular lane, values are copied from all registers for that lane in one sweep. Since the multi-register scatter instruction scatters elements from a single vector register to multiple vector registers with a single instruction, it removes the costly shuffles and permutes that were previously necessary, thereby improving performance.

The multi-register scatter instruction may be automatically generated by a compiler or may be hand-coded by a software developer. The single multi-register scatter instruction not only saves instruction count but also eases programming complexity. The single multi-register scatter instruction also reduces execution port pressure and reduces usage of internal buffers such as RS (Reservation Station), ROB (Re-Order Buffer), fetch and decode buffers, giving increased performance and reduced power consumption.

Figure 4:
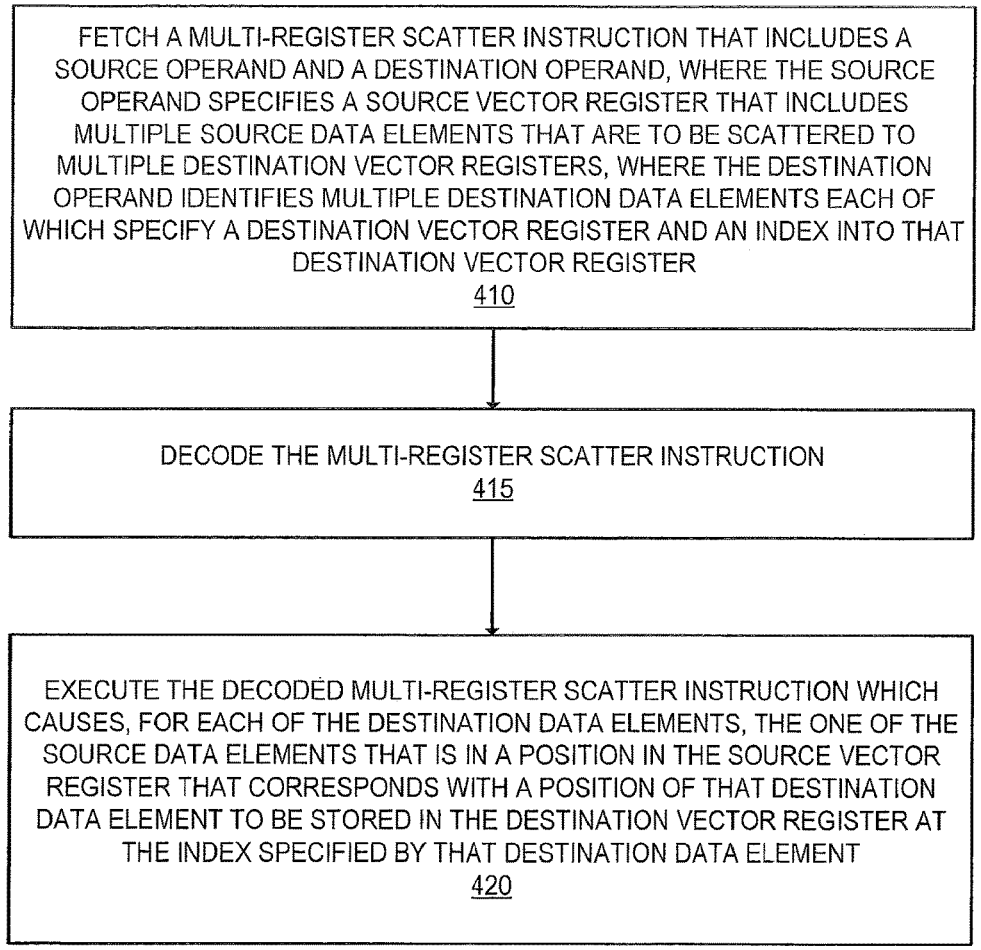
FIG. 4 is a flow diagram illustrating exemplary operations for scattering multiple values from a single vector register to multiple vector registers by executing a multi-register scatter instruction in a processor according to one embodiment.

FIG. 4 is a flow diagram illustrating exemplary operations for scattering multiple values from a single vector register to multiple vector registers by executing a multi-register scatter instruction in a processor according to one embodiment. At operation 410, a multi-register scatter instruction is fetched by the processor (e.g., by a fetch unit of the processor). The multi-register scatter instruction includes a source operand and a destination operand. The source operand specifies a source vector register that includes multiple source data elements that are to be scattered to multiple destination vector registers (e.g., an xmm, ymm, or zmm register). The destination operand identifies multiple destination data elements, each of which specifies a destination vector register and an index into that destination vector register.

For example, in one embodiment, the destination operand specifies a vector register (e.g., an xmm, ymm, or zmm register) or a memory location that identifies multiple data elements that specify a destination vector register and an index into that destination vector register. Each data element also specifies whether a data element from the source vector register (specified by the source operand) should be copied to the specified destination vector register.

Flow moves from operation 410 to operation 415 where the processor decodes the multi-register scatter instruction. For example, in some embodiments, the processor includes a hardware decode unit that is provided the instruction (e.g., by the fetch unit of the processor). A variety of different well known decode units could be used for the decode unit. For example, the decode unit may decode the multi-register scatter instruction into a single wide micro instruction. As another example, the decode unit may decode the multi-register scatter instruction into multiple wide micro instructions. As another example particularly suited for out of order processor pipelines, the decode unit may decode the multi-register scatter instruction into one or more micro-ops, where each of the micro-ops may be issued and executed out of order. Also, the decode unit may be implemented with one or more decoders and each decoder may be implemented as a programmable logic array (PLA), as is well known in the art. By way of example, a given decode unit may: 1) have steering logic to direct different macro instructions to different decoders; 2) a first decoder that may decode a subset of the instruction set (but more of it than the second, third, and fourth decoders) and generate two micro-ops at a time; 3) a second, third, and fourth decoder that may each decode only a subset of the entire instruction set and generate only one micro-op at a time; 4) a micro-sequencer ROM that may decode only a subset of the entire instruction set and generate four micro-ops at a time; and 5) multiplexing logic feed by the decoders and the micro-sequencer ROM that determine whose output is provided to a micro-op queue. Other embodiments of the decode unit may have more or less decoders that decode more or less instructions and instruction subsets. For example, one embodiment may have a second, third, and fourth decoder that may each generate two micro-ops at a time; and may include a micro-sequencer ROM that generates eight micro-ops at a time.

Flow then moves to operation 420 where the processor executes the decoded multi-register scatter instruction causing, for each of the destination data elements identified through the destination operand, the one of the source data elements specified by the source operand that is in a position in the source vector register that corresponds with a position of that destination data element to be stored in the destination vector register at the index specified by that destination data element.

Figure 5:
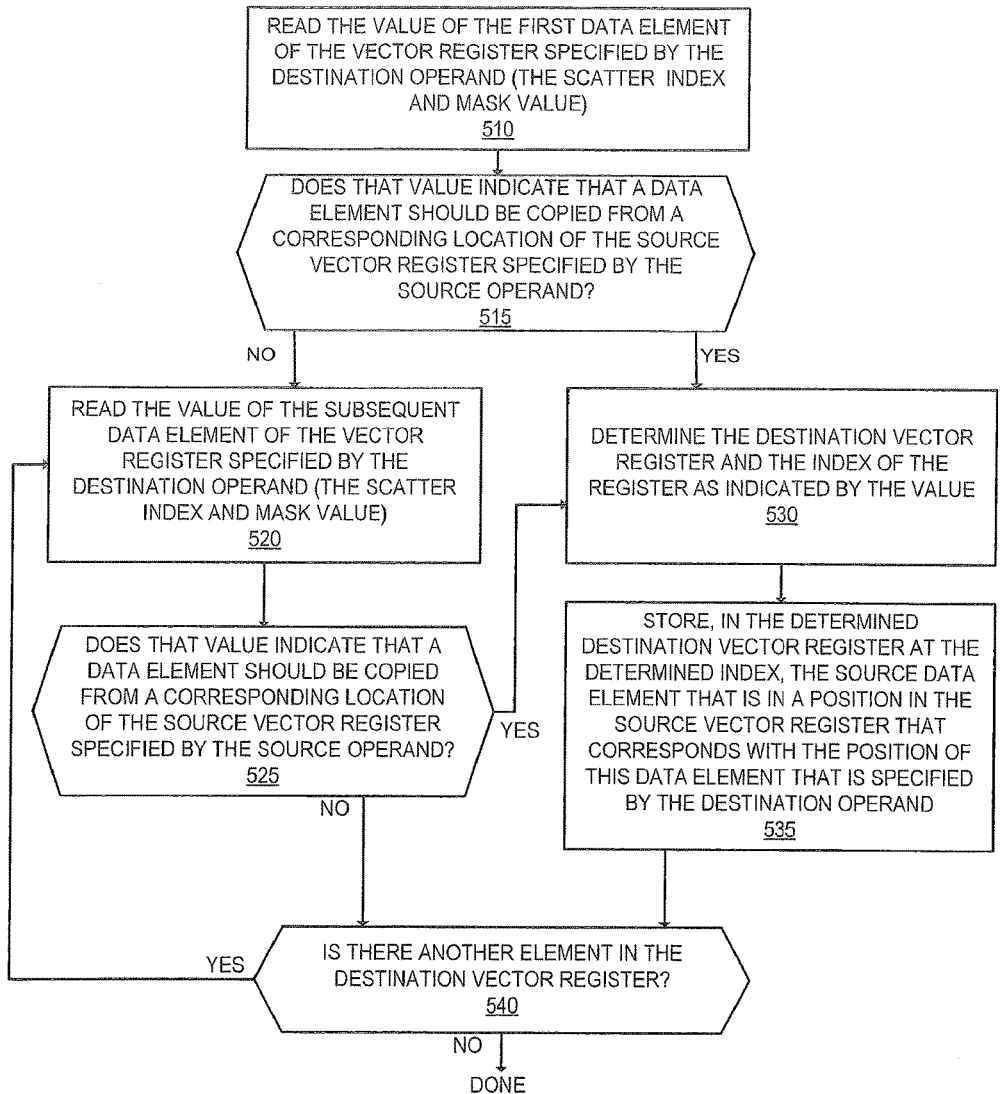
FIG. 5 is a flow diagram that illustrates exemplary operations for executing an occurrence of a multi-register scatter instruction where the destination operand specifies a vector register according to one embodiment.

FIG. 5 is a flow diagram that illustrates exemplary operations for executing an occurrence of a multi-register scatter instruction where the destination operand specifies a vector register according to one embodiment. In one embodiment, the operations described with reference to FIG. 5 are performed in conjunction with the operation 420.

At operation 510, the processor reads the value of the first data element of the vector register specified by the destination operand (the scatter index and mask value). In one embodiment the value takes the form of the scatter index and mask value format 210. Flow then moves to operation 515 where the processor determines whether the scatter index and mask value indicates that a data element should be copied from a corresponding location of the source vector register specified by the source operand. For example, with reference to the scatter index and mask value format 210, the processor determines whether the actionable bit 220 is set in the scatter index and mask value. If the scatter index and mask value indicates that a data element should be copied from the source vector register, flow moves to operation 530, otherwise flow moves to operation 520.

At operation 520, the processor reads the value of the subsequent data element of the vector register specified by the destination operand (the next scatter index and mask value). Flow then moves to operation 525 where the processor determines whether that scatter index and mask value indicates that a data element should be copied from a corresponding location of the source vector register specified by the source operand. If yes, then flow moves to operation 530, otherwise flow moves to operation 540.

At operation 530, the processor determines the destination vector register and the index of the register as indicated by the scatter index and mask value. For example, following the format of the scatter index and mask value format 210, the lower 8-bits of the value identifies the vector register (by register number), the next upper 8-bits identifies the index into the register. Flow then moves to operation 535, where the processor stores, in the determined destination vector register at the determined index, the source data element of the source vector register specified by the source operand that is in a position that corresponds with the position of the data element that is specified by the destination operand (the position of the scatter index and mask value in the vector register that is specified by the destination operand). Flow moves from operation 535 to operation 540.

At operation 540, the processor determines whether there is another data element in the destination vector register. If there is, then flow moves back to operation 520. If there is not, then the operations are complete.

Figure 6:
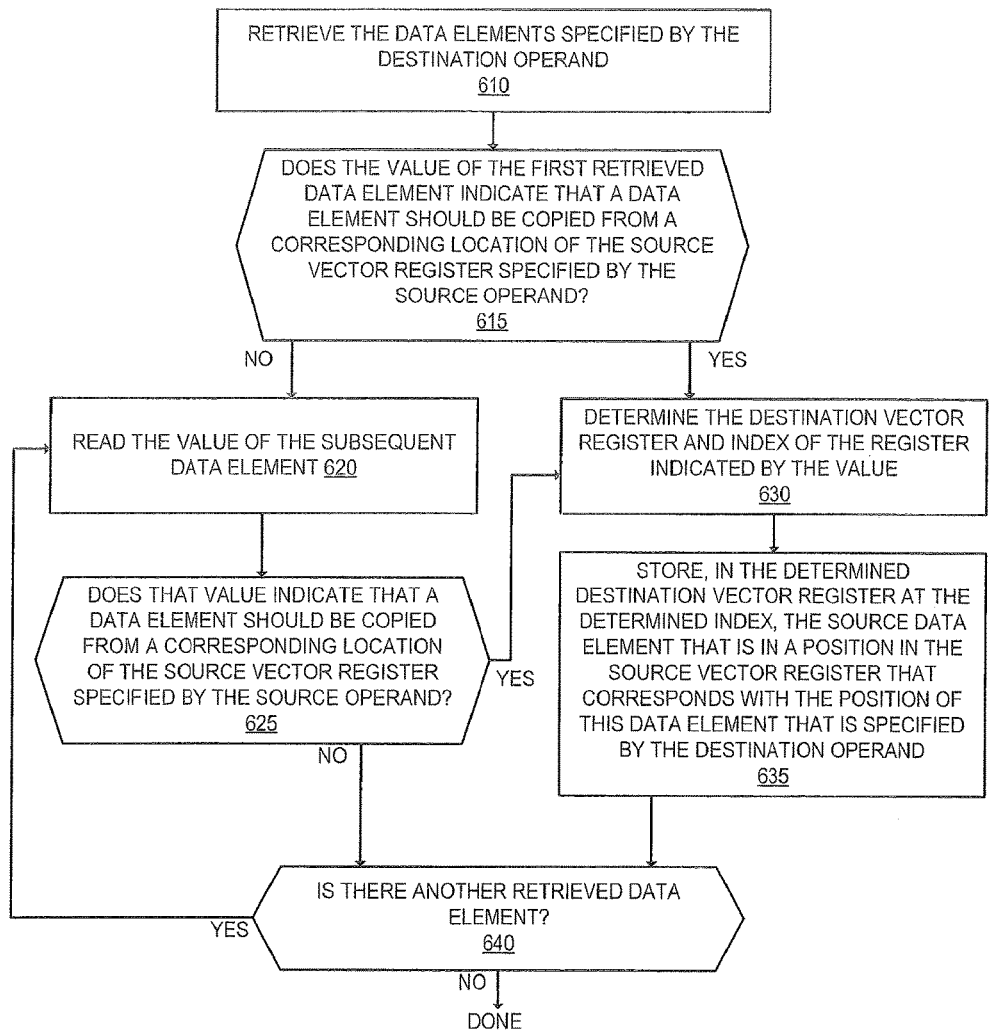
FIG. 6 is a flow diagram that illustrates exemplary operations for executing an occurrence of a multi-register scatter instruction where the destination operand specifies a memory location according to one embodiment.

FIG. 6 is a flow diagram that illustrates exemplary operations for executing an occurrence of a multi-register scatter instruction where the destination operand specifies a memory location according to one embodiment. In one embodiment, the operations described with reference to FIG. 6 are performed in conjunction with the operation 420.

At operation 610, the processor retrieves the data elements specified by the memory location identified in the destination operand. In one embodiment, the retrieved data elements each take the form of the scatter index and mask format 210. Flow then moves to operation 615 where the processor determines whether the scatter index and mask value of the first retrieved data element indicates that a data element should be copied from a corresponding location of the source vector register specified by the source operand. If the scatter index and mask value indicates that a data element should be copied from the source vector register, flow moves to operation 630, otherwise flow moves to operation 620.

At operation 620, the processor reads the value of the subsequent data element retrieved from the memory location specified by the destination operand (the next scatter index and mask value). Flow then moves to operation 625 where the processor determines whether that scatter index and mask value indicates that a data element should be copied from a corresponding location of the source vector register specified by the source operand. If yes, then flow moves to operation 630, otherwise flow moves to operation 640.

At operation 630, the processor determines the destination vector register and the index of the register indicated by the scatter index and mask value. Flow then moves to operation 635, where the processor stores, in the determined destination vector register at the determined index, the source data element of the source vector register specified by the source operand that is in a position that corresponds with the position of the data element that is specified by the destination operand (the position of the scatter index and mask value in the memory location that is specified by the destination operand). Flow moves from operation 635 to operation 640.

At operation 640, the processor determines whether there is another data element in the memory location specified by the destination operand. If there is, then flow moves back to operation 620. If there is not, then the operations are complete.

Alternative Embodiments

While embodiments described above describe a multi-register scatter instruction where the position in the source vector register corresponding to the position of the scatter index and mask value in the specified data element determines the source data element to be stored in the destination, in alternative embodiments the mask value allows a selection of the index of the source vector register.

For example, one example of this instruction is "ScatterMultiRegVar[PS/PD] zmm1, zmm2" where zmm1 and zmm2 are vector registers (such as 128-, 256-, 512-bit registers). The vector register zmm2 includes multiple source data elements (e.g., 16 data elements assuming each data element is 32 bits and zmm2 is a 512-bit register), of which at least one of them will be stored in destination vector registers according to the content of the vector register zmm1. The vector register zmm1 includes multiple data elements, each of which may specify another vector register (a destination vector register) and an index into that vector register (a destination index), and further specify an index into the source vector register (a source index). As a result of executing the instruction, the source data element corresponding to the specified source index will be stored in the destination vector register at the destination index. The "PS" portion of the instruction indicates a scalar floating point (4 bytes), whereas the "PD" portion of the instruction indicates a double floating point (8 bytes). Another example of the multiple-register scatter instruction for an integer vector form may also be used in embodiments such as "ScatterMultiReg[D/Q] zmm1, zmm2" that scatters a packed DWORD or QWORD integer elements.

Another example of this instruction is "ScatterMultiRegVar[PS/PD]<memory>, zmm2" where <memory> is a location in memory and zmm2 is a vector register (such as a 128-, 256-, 512-bit register). The vector register zmm2 includes multiple source data elements (e.g., 16 data elements assuming each data element is 32 bits and zmm2 is a 512-bit register), of which at least one of them will be stored in destination vector registers according to the content of the memory location <memory>. The memory location <memory> identifies multiple data elements, each of which may specify a vector register (a destination vector register) and an index into that vector register (a destination index), and further specify an index into the memory (a source index). As a result of executing the instruction, the source data element corresponding to the specified source index will be stored in the destination vector register at the destination index. The "PS" portion of the instruction indicates a scalar floating point (4 bytes), whereas the "PD" portion of the instruction indicates a double floating point (8 bytes). Another example of the multiple-register scatter instruction for an integer vector form may also be used in embodiments such as "ScatterMultiReg[D/Q]<memory>, zmm2" that scatters a packed DWORD or QWORD integer elements.

FIG. 7 illustrates an exemplary execution of a multiple-register scatter instruction according to one embodiment. The multiple-register scatter instruction 700 includes a destination operand 705 and a source operand 710. The multiple-register scatter instruction 700 belongs to an instruction set architecture, and each "occurrence" of the instruction 700 within an instruction stream would include values within the destination operand 705 and the source operand 710. In this example, both the destination operand 705 and the source operand 710 are vector registers (such as 128-, 256-, 512-bit registers). The vector registers may be zmm registers with 16 32-bit data elements, however, other data element and register sizes may be used such as xmm or ymm registers and 16- or 64-bit data elements.

The contents 750 of the source vector register specified by the source operand (zmm2 as illustrated) include multiple source data elements. As illustrated in FIG. 7, the source data element at index 0 of zmm2 contains the value 760, the source data element at index 1 of zmm2 contains the value 762, and the source data element at index 2 of zmm2 contains the value 764. The source data elements at indexes 3-15 of zmm2 may also contain values; however they are not illustrated in FIG. 7 because they will not be scattered as a result of the contents of zmm1, which will be described in greater detail below.

The vector register zmm1 includes multiple data elements, each of may specify a scatter index and mask value 742. Each scatter index and mask value 742 may indicate the following: a destination vector register, an index into that destination vector register (a destination register index), and an index into the source vector register (a source register index). Each scatter index and mask value 742 may also indicate whether execution of the instruction is to cause the data element corresponding to the source register index to be stored in the destination vector register. For a scalar floating point (PS), each scatter index and mask value 742 is 4 bytes (32 bits). In some embodiments, the lower 16-bits are used to represent the number of the destination vector register and an index into that vector register, 8 of the upper bits are used to represent an index into the source vector register, and the most significant bit indicates whether to take action (whether the source data element that corresponds to the index of the source vector register is to be copied into the specified destination vector register at the specified index). Thus, the data elements of the vector register specified by the destination operand 705 indicate the destination vector registers 745, an index into those registers, as well as indicating the source data elements that are to be copied.

FIG. 8 illustrates an exemplary scatter index and mask value format 810. The lower 8-bits of the scatter index and mask format 810 indicates the destination vector register number 810. The next upper 8-bits represents the destination register index 815. The next upper 8-bits represents the source register index 825. The most significant bit is an actionable bit 810 that indicates whether to take action (whether to store the source data element in the source register index identified by the source register index 825 at the destination data element identified by the register index 815 of the register identified by the register number 810. Thus, unlike the exemplary scatter index and mask value format 210 which did not provide the source register index, scatter index and mask value format 810 allows for the selection of source data elements from the source vector register 750 to be scattered. This allows, for example, a single source data element to be scattered to multiple different vector registers.

For example, using the scatter index and mask value format illustrated in FIG. 8, the data element identified at index 0 of the zmm1 register has the scatter index and mask value (in hexadecimal notation) 0x80000003h, which represents the destination vector register 3 (e.g., zmm3) and its index 0, and the source register index 0 (of the vector register zmm2 which is specified by the source operand 710), and is actionable. The data element identified at index 1 of the zmm1 vector register has the scatter index and mask value (in hexadecimal notation) 0x80010004h, which represents the destination vector register 4 (e.g., zmm4) and its index 0, the source register index 1 (of the vector register zmm2), and is actionable. The data element identified at index 2 of the zmm1 vector register has the scatter index and mask value 0x80010505h, which represents the vector register 5 (e.g., zmm5) and its index 5, the source register index 1 (of the vector register zmm2), and is actionable. The data element identified at index 3 of the zmm1 vector register has the scatter index and mask value 0x800200206h, which represents the vector register 6 (e.g., zmm6) and its index 2, the source register index 2 (of the vector register zmm2), and is actionable. The data elements identified at indexes 4-15 of the zmm1 vector register each have the scatter index and mask value 0x00000000h, which represents the vector register 0 (e.g., zmm0) and its index 0, the source register index 0, and is not actionable (meaning that there will not be an element that is scattered as a result of the scatter index and mask values of indexes 4-15 of the zmm1 register).

The selection of which bits represent the destination vector register number, which bits represent the index of that destination vector register, which bits represent the index of the source vector register, etc., can be chosen differently in different embodiments.

As illustrated in FIG. 7, as indicated by the scatter index and mask value of zmm1[0], the value 760, which is the value of the source data element at zmm2[0], is stored in the data element at zmm3[0] as a result of the instruction executing. As indicated by the scatter index and mask value of zmm1[1], the value 762, which is the value of the source data element at zmm2[1], is stored in the data element at zmm4[0] as a result of the instruction executing. As indicated by the scatter index and mask value of zmm1[2], the value 762, which is the value of the source data element at zmm2[1], is also stored in the data element at zmm5[5], as a result of the instruction executing. Thus, the value 762 has been scattered to multiple destination data elements. As indicated by the scatter index and mask value of zmm1[3], the value 764, which is the value of the source data element at zmm2[2], is stored in the data element at zmm6[2], as a result of the instruction executing.

Thus, after an occurrence of the instruction 700 being executed, the value 760 from zmm2[0] is stored in zmm3[0] (the data elements zmm3[1-15] are not changed as a result of the execution of the instruction 700), the value 162 from zmm2[1] is stored in zmm4[0] and zmm5[5] (the data elements zmm4[1-15] and zmm5[0-4; 6-15] are not changed as a result of the execution of the instruction 700), and the value 164 from zmm2[2] is stored in zmm6[2] (the data elements zmm6[0-1] and zmm6[3-15] are not changed as a result of the execution of instruction 700).

Figure 9:
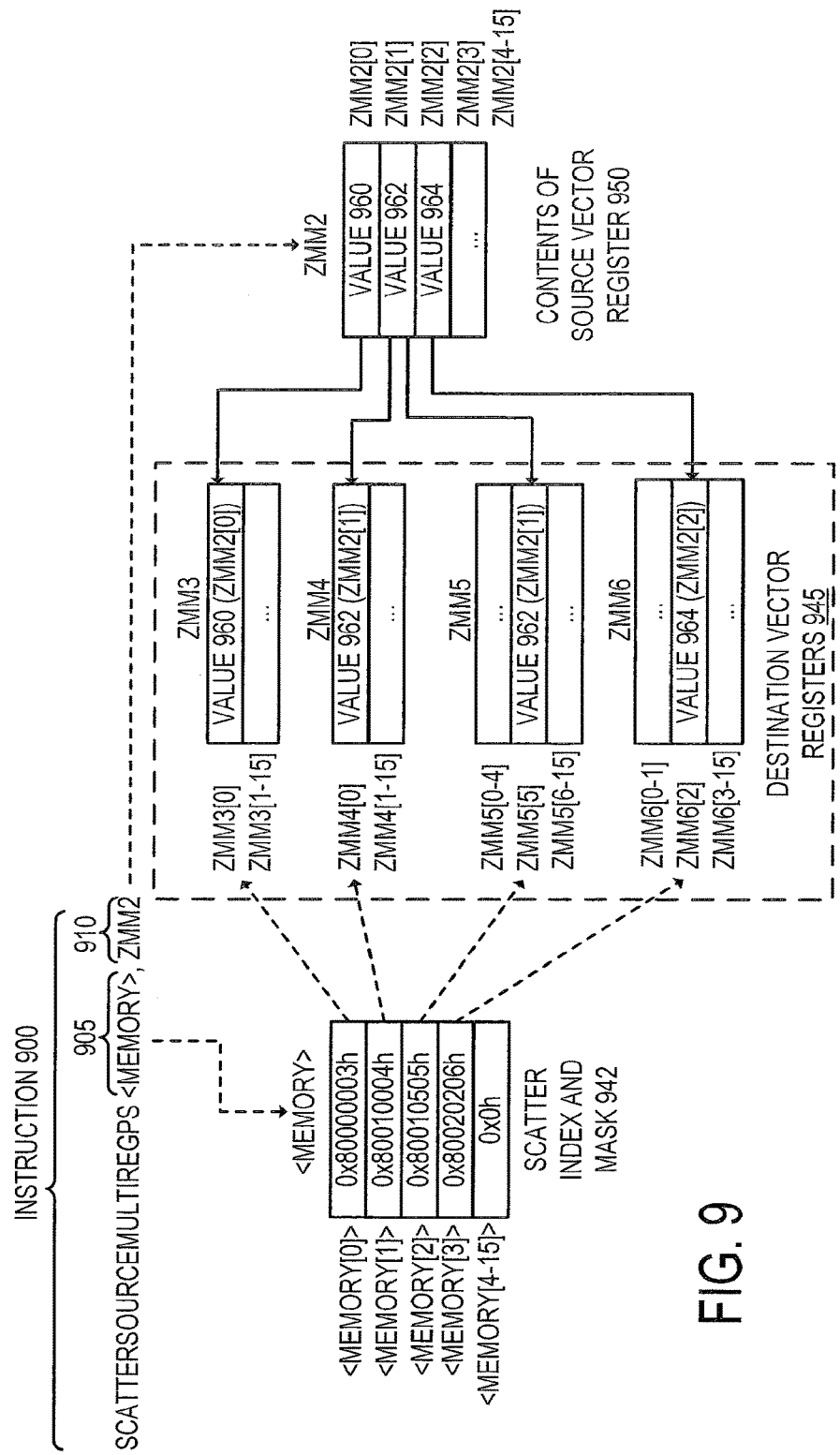
FIG. 9 illustrates another exemplary execution of a multiple-register scatter instruction according to one embodiment.

FIG. 9 illustrates another exemplary execution of a multiple-register scatter instruction according to one embodiment. The multiple-register scatter instruction 900 includes a destination operand 905 and a source operand 910. The multiple-register scatter instruction 900 belongs to an instruction set architecture, and each "occurrence" of the instruction 900 within an instruction stream would include values within the destination operand 905 and the source operand 910. In this example, the source operand 910 is a vector register (such as a 128-, 256-, 512-bit register) and the destination operand 905 is a location in memory that identifies multiple destination data elements each of which may specify a scatter index and mask value 942. In one embodiment, the format of the scatter index and mask value 942 is the same as described with respect to FIGS. 7 and 8.

The contents 950 of the source vector register specified by the source operand (zmm2 as illustrated) include multiple source data elements. As illustrated in FIG. 9, the source data element at index 0 of zmm2 contains the value 960, the source data element at index 1 of zmm2 contains the value 962, and the source data element at index 2 of zmm2 contains the value 964. The source data elements at indexes 4-15 of zmm2 may also contain values; however they are not illustrated in FIG. 9 because they will not be scattered as a result of the contents of the memory location specified by the destination operand 905, which will be described in greater detail below.

The memory location specified by the operand 905 includes multiple data elements, each of may specify a scatter index and mask value 942. Each scatter index and mask value 942 may indicate the following: a destination vector register, an index into that destination vector register (a destination register index), and an index into the source vector register (a source register index). Thus, the data elements of the memory location specified by the destination operand 905 indicate the destination vector registers 945, an index into those registers, as well as indicating the source data elements that are to be copied.

Using the scatter index and mask value format illustrated in FIG. 9, the data element identified at index 0 of the memory location specified by the operand 905 has the scatter index and mask value (in hexadecimal notation) 0x80000003h, which represents the destination vector register 3 (e.g., zmm3) and its index 0, and the source register index 0 (of the vector register zmm2 which is specified by the source operand 710), and is actionable. The data element identified at index 1 of the memory location specified by the operand 905 has the scatter index and mask value (in hexadecimal notation) 0x80010004h, which represents the destination vector register 4 (e.g., zmm4) and its index 0, the source register index 1 (of the vector register zmm2), and is actionable. The data element identified at index 2 of the memory location specified by the operand 905 has the scatter index and mask value 0x80010505h, which represents the vector register 5 (e.g., zmm5) and its index 5, the source register index 1 (of the vector register zmm2), and is actionable. The data element identified at index 3 of the memory location specified by the operand 905 has the scatter index and mask value 0x800200206h, which represents the vector register 6 (e.g., zmm6) and its index 2, the source register index 2 (of the vector register zmm2), and is actionable. The data elements identified at indexes 4-15 of the memory location specified by operand 905 each have the scatter index and mask value 0x0h, which indicates that an element will not be scattered for these.

As illustrated in FIG. 9, as indicated by the scatter index and mask value of index 0 of the memory location specified by the operand 905, the value 960, which is the value of the source data element at zmm2[0], is stored in the data element at zmm3[0] as a result of the instruction executing. As indicated by the scatter index and mask value of index 1 of the memory location specified by the operand 905, the value 962, which is the value of the source data element at zmm2[1], is stored in the data element at zmm4[0] as a result of the instruction executing. As indicated by the scatter index and mask value of index 2 of the memory location specified by the operand 905, the value 962, which is the value of the source data element at zmm2[1], is also stored in the data element at zmm5[5], as a result of the instruction executing. Thus, the value 962 has been scattered to multiple destination data elements. As indicated by the scatter index and mask value of index 3 of the memory location specified by the operand 905, the value 964, which is the value of the source data element at zmm2[2], is stored in the data element at zmm6[2], as a result of the instruction executing.

Thus, the multi-register scatter instruction described with reference to FIGS. 7-9 causes one or more source data elements from single vector register to be stored in data elements of multiple vector registers with a single instruction. In some embodiments, accesses are optimized such that when in a particular lane, values are copied from all registers for that lane in one sweep. Since the multi-register scatter instruction scatters element(s) from a single vector register to multiple vector registers with a single instruction, it removes the costly shuffles and permutes that were previously necessary, thereby improving performance.

Figure 10:
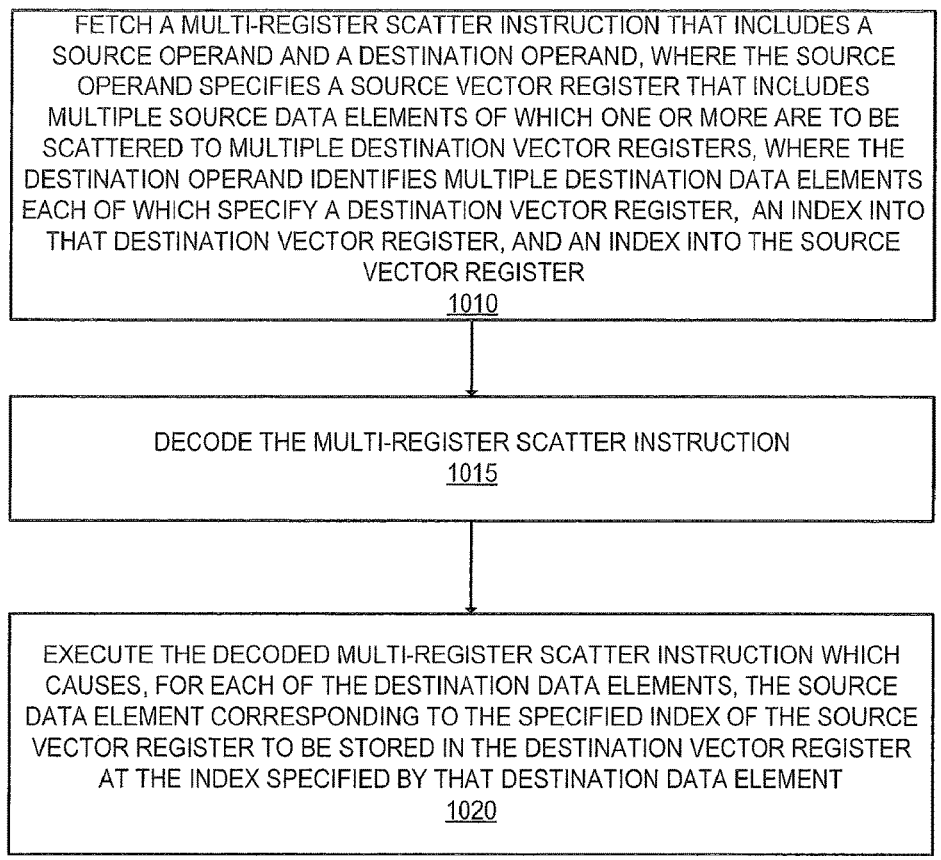
FIG. 10 is a flow diagram illustrating exemplary operations for scattering one or more values from a single vector register to multiple vector registers by executing a multi-register scatter instruction in a processor according to one embodiment.

FIG. 10 is a flow diagram illustrating exemplary operations for scattering one or more values from a single vector register to multiple vector registers by executing a multi-register scatter instruction in a processor according to one embodiment. At operation 1010, a multi-register scatter instruction is fetched by the processor (e.g., by a fetch unit of the processor). The multi-register scatter instruction includes a source operand and a destination operand. The source operand specifies a source vector register that includes multiple source data elements; one or more of which are to be scattered to multiple destination vector registers (e.g., an xmm, ymm, or zmm register). The destination operand identifies multiple destination data elements, each of which specifies a destination vector register, an index into that destination vector register, and an index into the source vector register specified by the source operand.

For example, in one embodiment, the destination operand specifies a vector register (e.g., an xmm, ymm, or zmm register) or a memory location that identifies multiple data elements that specify a destination vector register, an index into that destination vector register, and an index into the source vector register specified by the source operand. Each data element may also specify whether the data element from the source vector register should be copied to the specified destination vector register.

Flow moves from operation 1010 to operation 1015 where the processor decodes the multi-register scatter instruction. For example, in some embodiments, the processor includes a hardware decode unit that is provided the instruction (e.g., by the fetch unit of the processor). A variety of different well known decode units could be used for the decode unit, as described above. Flow then moves to operation 1020 where the processor executes the decoded multi-register scatter instruction causing, for each of the destination data elements, the source data element corresponding to the specified index of the source vector register to be stored in the destination vector register at the index specified by that destination data element.

Figure 11:
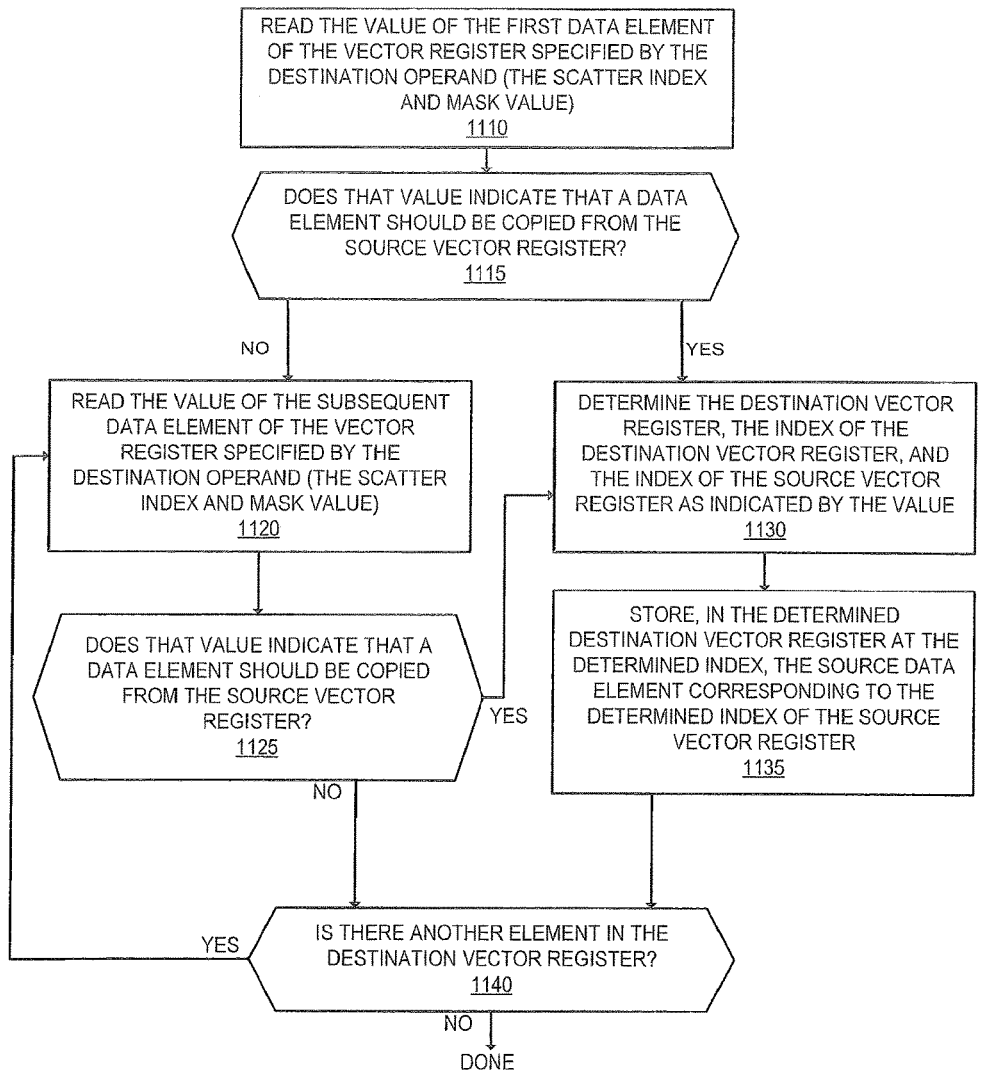
FIG. 11 is a flow diagram that illustrates exemplary operations for executing an occurrence of a multi-register scatter instruction where the destination operand specifies a vector register according to one embodiment.

FIG. 11 is a flow diagram that illustrates exemplary operations for executing an occurrence of a multi-register scatter instruction where the destination operand specifies a vector register according to one embodiment. In one embodiment, the operations described with reference to FIG. 11 are performed in conjunction with the operation 1020.

At operation 1110, the processor reads the value of the first data element of the vector register specified by the destination operand (the scatter index and mask value). In one embodiment the value takes the form of the scatter index and mask value format 810. Flow then moves to operation 1115 where the processor determines whether the scatter index and mask value indicates that a data element should be copied from the source vector register. For example, with reference to the scatter index and mask value format 810, the processor determines whether the actionable bit 820 is set in the scatter index and mask value. If the scatter index and mask value indicates that a data element should be copied from the source vector register, flow moves to operation 1130, otherwise flow moves to operation 1120.

At operation 1120, the processor reads the value of the subsequent data element of the vector register specified by the destination operand (the next scatter index and mask value). Flow then moves to operation 1125 where the processor determines whether that scatter index and mask value indicates that a data element should be copied from the source vector register specified by the source operand. If yes, then flow moves to operation 1130, otherwise flow moves to operation 1140.

At operation 1130, the processor determines the destination vector register, the index of the destination vector register, and the index of the source vector register, as indicated by the scatter index and mask value. For example, following the format of the scatter index and mask value format 810, the lower 8-bits of the value identifies the destination vector register (by register number), the next upper 8-bits identifies the index into the destination vector register, and the next upper 8-bits identifies the index into the source vector register.

Flow then moves to operation 1135, where the processor stores, in the determined destination vector register at the determined index, the determined source data element. Flow moves from operation 1135 to operation 1140.

At operation 1140, the processor determines whether there is another data element in the destination vector register. If there is, then flow moves back to operation 1120. If there is not, then the operations are complete.

Figure 12:
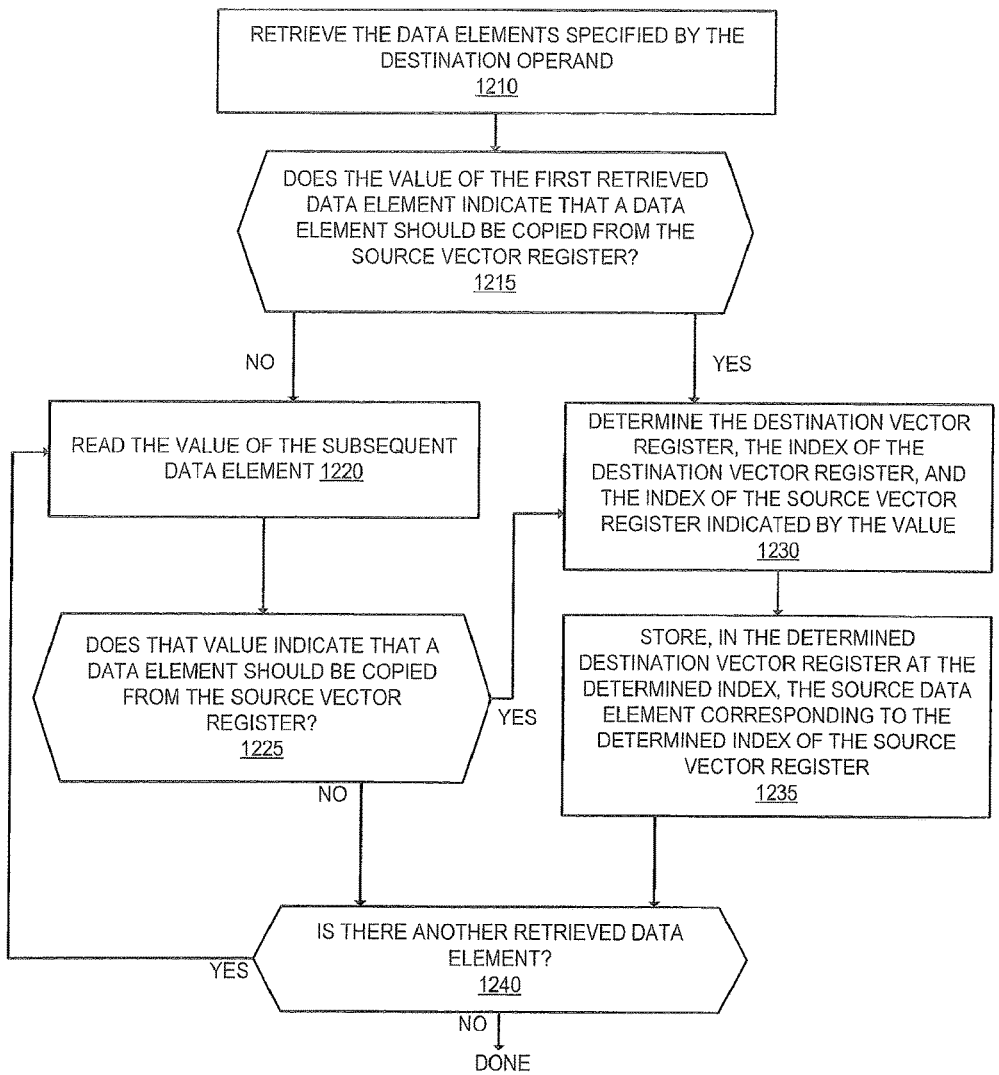
FIG. 12 is a flow diagram that illustrates exemplary operations for executing an occurrence of a multi-register scatter instruction where the destination operand specifies a memory location according to one embodiment.

FIG. 12 is a flow diagram that illustrates exemplary operations for executing an occurrence of a multi-register scatter instruction where the destination operand specifies a memory location according to one embodiment. In one embodiment, the operations described with reference to FIG. 12 are performed in conjunction with the operation 1020. At operation 1210, the processor retrieves the data elements specified by the memory location identified in the destination operand. In one embodiment, the retrieved data elements each take the form of the scatter index and mask format 810. Flow then moves to operation 1215 where the processor determines whether the scatter index and mask value of the first retrieved data element indicates that a data element should be copied from the source vector register specified by the source operand. If the scatter index and mask value indicates that a data element should be copied from the source vector register, flow moves to operation 1230, otherwise flow moves to operation 1220.

At operation 1220, the processor reads the value of the subsequent data element retrieved from the memory location specified by the destination operand (the next scatter index and mask value). Flow then moves to operation 1225 where the processor determines whether that scatter index and mask value indicates that a data element should be copied from the source vector register specified by the source operand. If yes, then flow moves to operation 1230, otherwise flow moves to operation 1240.

At operation 1230, the processor determines the destination vector register, the index of the destination vector register, and the index of the source vector register, as indicated by the scatter index and mask value. Flow then moves to operation 1235, where the processor stores, in the determined destination vector register at the determined index, the determined source data element. Flow moves from operation 1235 to operation 1240.

At operation 1240, the processor determines whether there is another data element in the memory location specified by the destination operand. If there is, then flow moves back to operation 1220. If there is not, then the operations are complete.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 13A illustrates an exemplary AVX instruction format including a VEX prefix 1302, real opcode field 1330, Mod R/M byte 1340, SIB byte 1350, displacement field 1362, and IMM8 1372. FIG. 13B illustrates which fields from FIG. 13A make up a full opcode field 1374 and a base operation field 1342. FIG. 13C illustrates which fields from FIG. 13A make up a register index field 1344.

VEX Prefix (Bytes 0-2) 1302 is encoded in a three-byte form. The first byte is the Format Field 1340 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 1305 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 1315 (VEX byte 1, bits [4:0]—mmmmm) includes content to encode an implied leading opcode byte. W Field 1364 (VEX byte 2, bit [7]—W)—is represented by the notation VEX.W, and provides different functions depending on the instruction. The role of VEX.vvvv 1320 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 1368 Size field (VEX byte 2, bit [2]—L)=0, it indicates 128 bit vector; if VEX.L=1, it indicates 256 bit vector. Prefix encoding field 1325 (VEX byte 2, bits [1:0]—pp) provides additional bits for the base operation field.

Real Opcode Field 1330 (Byte 3) is also known as the opcode byte. Part of the opcode is specified in this field.

MOD R/M Field 1340 (Byte 4) includes MOD field 1342 (bits [7-6]), Reg field 1344 (bits [5-3]), and R/M field 1346 (bits [2-0]). The role of Reg field 1344 may include the following: encoding either the destination register operand or a source register operand (the rrr of Rrrr), or be treated as an opcode extension and not used to encode any instruction operand. The role of R/M field 1346 may include the following: encoding the instruction operand that references a memory address, or encoding either the destination register operand or a source register operand.

Scale, Index, Base (SIB)—The content of Scale field 1350 (Byte 5) includes SS1352 (bits [7-6]), which is used for memory address generation. The contents of SIB.xxx 1354 (bits [5-3]) and SIB.bbb 1356 (bits [2-0]) have been previously referred to with regard to the register indexes Xxxx and Bbbb.

The Displacement Field 1362 and the immediate field (IMM8) 1372 contain address data.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 14A:
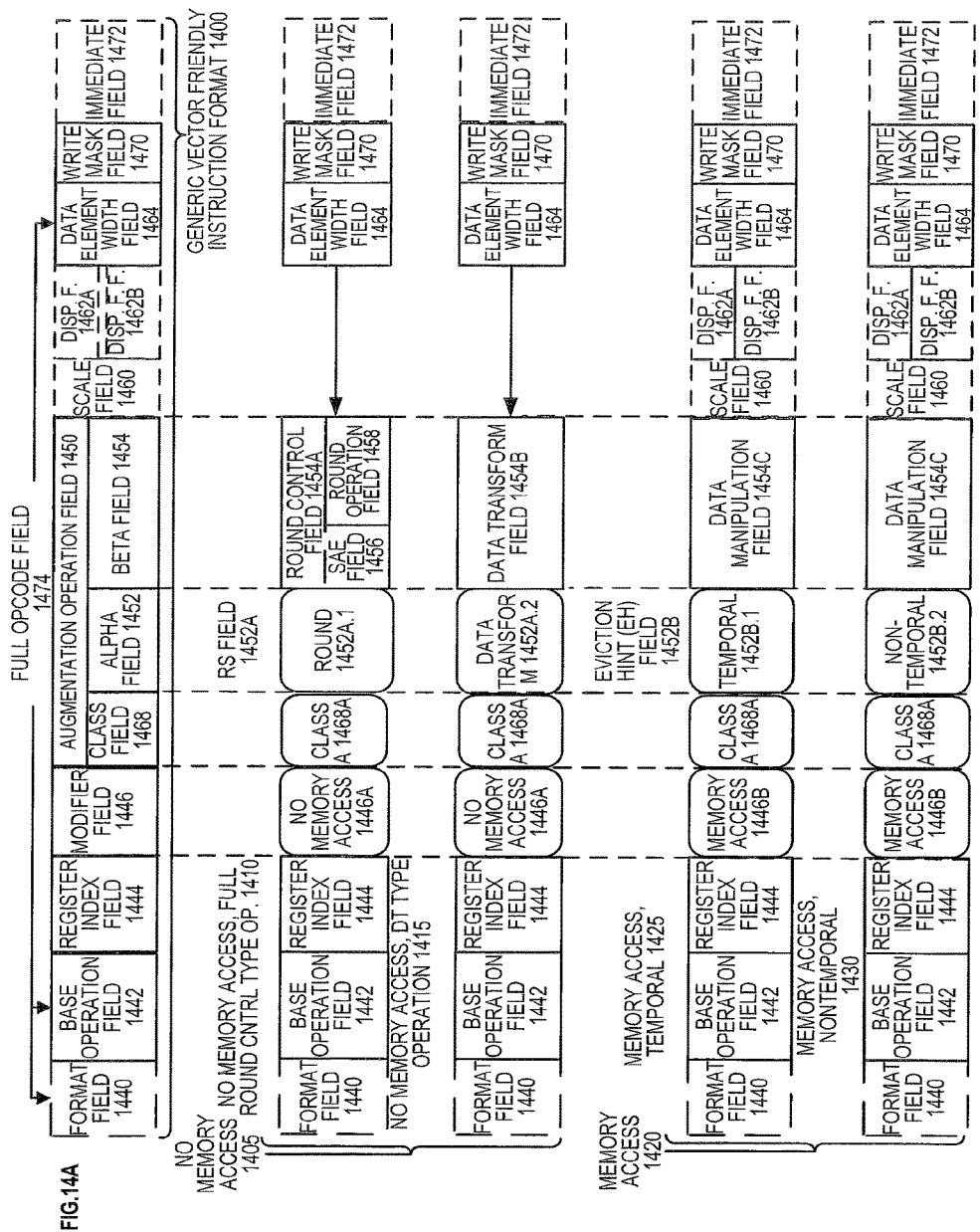
FIG. 14A is a block diagram illustrating a generic vector friendly instruction format and class A instruction templates thereof according to embodiments of the invention.
Figure 14B:
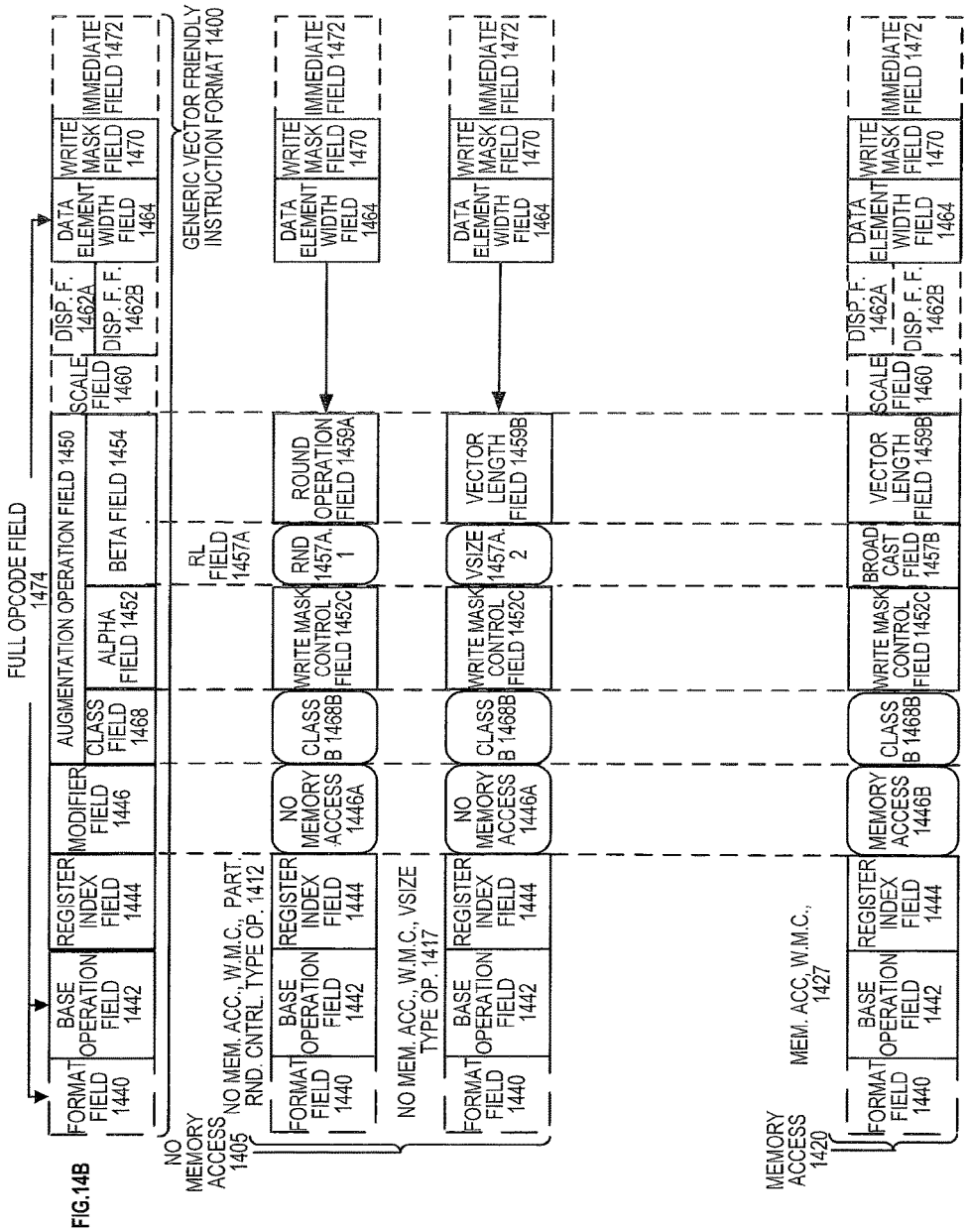
FIG. 14B is a block diagram illustrating the generic vector friendly instruction format and class B instruction templates thereof according to embodiments of the invention

FIGS. 14A-14B are block diagrams illustrating a generic vector friendly instruction format and instruction templates thereof according to embodiments of the invention. FIG. 14A is a block diagram illustrating a generic vector friendly instruction format and class A instruction templates thereof according to embodiments of the invention; while FIG. 14B is a block diagram illustrating the generic vector friendly instruction format and class B instruction templates thereof according to embodiments of the invention. Specifically, a generic vector friendly instruction format 1400 for which are defined class A and class B instruction templates, both of which include no memory access 1405 instruction templates and memory access 1420 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 14A include: 1) within the no memory access 1405 instruction templates there is shown a no memory access, full round control type operation 1410 instruction template and a no memory access, data transform type operation 1415 instruction template; and 2) within the memory access 1420 instruction templates there is shown a memory access, temporal 1425 instruction template and a memory access, non-temporal 1430 instruction template. The class B instruction templates in FIG. 14B include: 1) within the no memory access 1405 instruction templates there is shown a no memory access, write mask control, partial round control type operation 1412 instruction template and a no memory access, write mask control, vsize type operation 1417 instruction template; and 2) within the memory access 1420 instruction templates there is shown a memory access, write mask control 1427 instruction template.

The generic vector friendly instruction format 1400 includes the following fields listed below in the order illustrated in FIGS. 14A-14B.

Format field 1440—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1442—its content distinguishes different base operations.

Register index field 1444—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1446—its content distinguishes occurrences of instructions in the generic vector instruction format that specify memory access from those that do not; that is, between no memory access 1405 instruction templates and memory access 1420 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1450—its content distinguishes which one of a variety of different operations to be performed in addition to the base operation. This field is context specific. In one embodiment of the invention, this field is divided into a class field 1468, an alpha field 1452, and a beta field 1454. The augmentation operation field 1450 allows common groups of operations to be performed in a single instruction rather than 2, 3, or 4 instructions.

Scale field 1460—its content allows for the scaling of the index field's content for memory address generation (e.g., for address generation that uses $2^{scale}*index+base$).

Displacement Field 1462A—its content is used as part of memory address generation (e.g., for address generation that uses $2^{scale}*index+base+displacement$).

Displacement Factor Field 1462B (note that the juxtaposition of displacement field 1462A directly over displacement factor field 1462B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1474 (described later herein) and the data manipulation field 1454C. The displacement field 1462A and the displacement factor field 1462B are optional in the sense that they are not used for the no memory access 1405 instruction templates and/or different embodiments may implement only one or none of the two.

Data element width field 1464—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1470—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1470 allows for partial vector operations, including loads, stores, arithmetic, logical, etc. While embodiments of the invention are described in which the write mask field's 1470 content selects one of a number of write mask registers that contains the write mask to be used (and thus the write mask field's 1470 content indirectly identifies that masking to be performed), alternative embodiments instead or additional allow the mask write field's 1470 content to directly specify the masking to be performed.

Immediate field 1472—its content allows for the specification of an immediate. This field is optional in the sense that is it not present in an implementation of the generic vector friendly format that does not support immediate and it is not present in instructions that do not use an immediate.

Class field 1468—its content distinguishes between different classes of instructions. With reference to FIGS. 14A-B, the contents of this field select between class A and class B instructions. In FIGS. 14A-B, rounded corner squares are used to indicate a specific value is present in a field (e.g., class A 1468A and class B 1468B for the class field 1468 respectively in FIGS. 14A-B).

Instruction Templates of Class A

In the case of the non-memory access 1405 instruction templates of class A, the alpha field 1452 is interpreted as an RS field 1452A, whose content distinguishes which one of the different augmentation operation types are to be performed (e.g., round 1452A.1 and data transform 1452A.2 are respectively specified for the no memory access, round type operation 1410 and the no memory access, data transform type operation 1415 instruction templates), while the beta field 1454 distinguishes which of the operations of the specified type is to be performed. In the no memory access 1405 instruction templates, the scale field 1460, the displacement field 1462A, and the displacement scale filed 1462B are not present.

No-Memory Access Instruction Templates—Full Round Control Type Operation

In the no memory access full round control type operation 1410 instruction template, the beta field 1454 is interpreted as a round control field 1454A, whose content(s) provide static rounding. While in the described embodiments of the invention the round control field 1454A includes a suppress all floating point exceptions (SAE) field 1456 and a round operation control field 1458, alternative embodiments may support may encode both these concepts into the same field or only have one or the other of these concepts/fields (e.g., may have only the round operation control field 1458).

SAE field 1456—its content distinguishes whether or not to disable the exception event reporting; when the SAE field's 1456 content indicates suppression is enabled, a given instruction does not report any kind of floating-point exception flag and does not raise any floating point exception handler.

Round operation control field 1458—its content distinguishes which one of a group of rounding operations to perform (e.g., Round-up, Round-down, Round-towards-zero and Round-to-nearest). Thus, the round operation control field 1458 allows for the changing of the rounding mode on a per instruction basis. In one embodiment of the invention where a processor includes a control register for specifying rounding modes, the round operation control field's 1450 content overrides that register value.

No Memory Access Instruction Templates—Data Transform Type Operation

In the no memory access data transform type operation 1415 instruction template, the beta field 1454 is interpreted as a data transform field 1454B, whose content distinguishes which one of a number of data transforms is to be performed (e.g., no data transform, swizzle, broadcast).

In the case of a memory access 1420 instruction template of class A, the alpha field 1452 is interpreted as an eviction hint field 1452B, whose content distinguishes which one of the eviction hints is to be used (in FIG. 14A, temporal 1452B.1 and non-temporal 1452B.2 are respectively specified for the memory access, temporal 1425 instruction template and the memory access, non-temporal 1430 instruction template), while the beta field 1454 is interpreted as a data manipulation field 1454C, whose content distinguishes which one of a number of data manipulation operations (also known as primitives) is to be performed (e.g., no manipulation; broadcast; up conversion of a source; and down conversion of a destination). The memory access 1420 instruction templates include the scale field 1460, and optionally the displacement field 1462A or the displacement scale field 1462B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1452 is interpreted as a write mask control (Z) field 1452C, whose content distinguishes whether the write masking controlled by the write mask field 1470 should be a merging or a zeroing.

In the case of the non-memory access 1405 instruction templates of class B, part of the beta field 1454 is interpreted as an RL field 1457A, whose content distinguishes which one of the different augmentation operation types are to be performed (e.g., round 1457A.1 and vector length (VSIZE) 1457A.2 are respectively specified for the no memory access, write mask control, partial round control type operation 1412 instruction template and the no memory access, write mask control, VSIZE type operation 1417 instruction template), while the rest of the beta field 1454 distinguishes which of the operations of the specified type is to be performed. In the no memory access 1405 instruction templates, the scale field 1460, the displacement field 1462A, and the displacement scale filed 1462B are not present.

In the no memory access, write mask control, partial round control type operation 1410 instruction template, the rest of the beta field 1454 is interpreted as a round operation field 1459A and exception event reporting is disabled (a given instruction does not report any kind of floating-point exception flag and does not raise any floating point exception handler).

Round operation control field 1459A—just as round operation control field 1458, its content distinguishes which one of a group of rounding operations to perform (e.g., Round-up, Round-down, Round-towards-zero and Round-to-nearest). Thus, the round operation control field 1459A allows for the changing of the rounding mode on a per instruction basis. In one embodiment of the invention where a processor includes a control register for specifying rounding modes, the round operation control field's 1450 content overrides that register value.

In the no memory access, write mask control, VSIZE type operation 1417 instruction template, the rest of the beta field 1454 is interpreted as a vector length field 1459B, whose content distinguishes which one of a number of data vector lengths is to be performed on (e.g., 128, 256, or 512 byte).

In the case of a memory access 1420 instruction template of class B, part of the beta field 1454 is interpreted as a broadcast field 1457B, whose content distinguishes whether or not the broadcast type data manipulation operation is to be performed, while the rest of the beta field 1454 is interpreted the vector length field 1459B. The memory access 1420 instruction templates include the scale field 1460, and optionally the displacement field 1462A or the displacement scale field 1462B.

With regard to the generic vector friendly instruction format 1400, a full opcode field 1474 is shown including the format field 1440, the base operation field 1442, and the data element width field 1464. While one embodiment is shown where the full opcode field 1474 includes all of these fields, the full opcode field 1474 includes less than all of these fields in embodiments that do not support all of them. The full opcode field 1474 provides the operation code (opcode).

The augmentation operation field 1450, the data element width field 1464, and the write mask field 1470 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 15A is a block diagram illustrating an exemplary specific vector friendly instruction format according to embodiments of the invention. FIG. 15A shows a specific vector friendly instruction format 1500 that is specific in the sense that it specifies the location, size, interpretation, and order of the fields, as well as values for some of those fields. The specific vector friendly instruction format 1500 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 14 into which the fields from FIG. 15 map are illustrated.

It should be understood that, although embodiments of the invention are described with reference to the specific vector friendly instruction format 1500 in the context of the generic vector friendly instruction format 1400 for illustrative purposes, the invention is not limited to the specific vector friendly instruction format 1500 except where claimed. For example, the generic vector friendly instruction format 1400 contemplates a variety of possible sizes for the various fields, while the specific vector friendly instruction format 1500 is shown as having fields of specific sizes. By way of specific example, while the data element width field 1464 is illustrated as a one bit field in the specific vector friendly instruction format 1500, the invention is not so limited (that is, the generic vector friendly instruction format 1400 contemplates other sizes of the data element width field 1464).

The generic vector friendly instruction format 1400 includes the following fields listed below in the order illustrated in FIG. 15A.

EVEX Prefix (Bytes 0-3) 1502—is encoded in a four-byte form.

Format Field 1440 (EVEX Byte 0, bits [7:0])—the first byte (EVEX Byte 0) is the format field 1440 and it contains 0x62 (the unique value used for distinguishing the vector friendly instruction format in one embodiment of the invention).

The second-fourth bytes (EVEX Bytes 1-3) include a number of bit fields providing specific capability.

REX field 1505 (EVEX Byte 1, bits [7-5])—consists of a EVEX.R bit field (EVEX Byte 1, bit [7]—R), EVEX.X bit field (EVEX byte 1, bit [6]—X), and 1457 BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1410—this is the first part of the REX' field 1410 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1515 (EVEX byte 1, bits [3:0]—mmmm)—its content encodes an implied leading opcode byte (0F, 0F 38, or 0F 3).

Data element width field 1464 (EVEX byte 2, bit [7]—W)—is represented by the notation EVEX.W. EVEX.W is used to define the granularity (size) of the datatype (either 32-bit data elements or 64-bit data elements).

EVEX.vvvv 1520 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1520 encodes the 4 low-order bits of the first source register specifier stored in inverted (1s complement) form. Depending on the instruction, an extra different EVEX bit field is used to extend the specifier size to 32 registers.

EVEX.U 1468 Class field (EVEX byte 2, bit [2]—U)—If EVEX.U=0, it indicates class A or EVEX.U0; if EVEX.U=1, it indicates class B or EVEX.U1.

Prefix encoding field 1525 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1452 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1454 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1410—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1470 (EVEX byte 3, bits [2:0]—kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1530 (Byte 4) is also known as the opcode byte. Part of the opcode is specified in this field.

MOD R/M Field 1540 (Byte 5) includes MOD field 1542, Reg field 1544, and R/M field 1546. As previously described, the MOD field's 1542 content distinguishes between memory access and non-memory access operations. The role of Reg field 1544 can be summarized to two situations: encoding either the destination register operand or a source register operand, or be treated as an opcode extension and not used to encode any instruction operand. The role of R/M field 1546 may include the following: encoding the instruction operand that references a memory address, or encoding either the destination register operand or a source register operand.

Scale, Index, Base (SIB) Byte (Byte 6)—As previously described, the scale field's 1450 content is used for memory address generation. SIB.xxx 1554 and SIB.bbb 1556—the contents of these fields have been previously referred to with regard to the register indexes Xxxx and Bbbb.

Displacement field 1462A (Bytes 7-10)—when MOD field 1542 contains 10, bytes 7-10 are the displacement field 1462A, and it works the same as the legacy 32-bit displacement (disp32) and works at byte granularity.

Displacement factor field 1462B (Byte 7)—when MOD field 1542 contains 01, byte 7 is the displacement factor field 1462B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1462B is a reinterpretation of disp8; when using displacement factor field 1462B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1462B substitutes the legacy x86 instruction set 8-bit displacement. Thus, the displacement factor field 1462B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1472 operates as previously described.

Full Opcode Field

FIG. 15B is a block diagram illustrating the fields of the specific vector friendly instruction format 1500 that make up the full opcode field 1474 according to one embodiment of the invention. Specifically, the full opcode field 1474 includes the format field 1440, the base operation field 1442, and the data element width (W) field 1464. The base operation field 1442 includes the prefix encoding field 1525, the opcode map field 1515, and the real opcode field 1530.

Register Index Field

FIG. 15C is a block diagram illustrating the fields of the specific vector friendly instruction format 1500 that make up the register index field 1444 according to one embodiment of the invention. Specifically, the register index field 1444 includes the REX field 1505, the REX' field 1510, the MODR/M.reg field 1544, the MODR/M.r/m field 1546, the VVVV field 1520, xxx field 1554, and the bbb field 1556.

Augmentation Operation Field

Figure 15D:
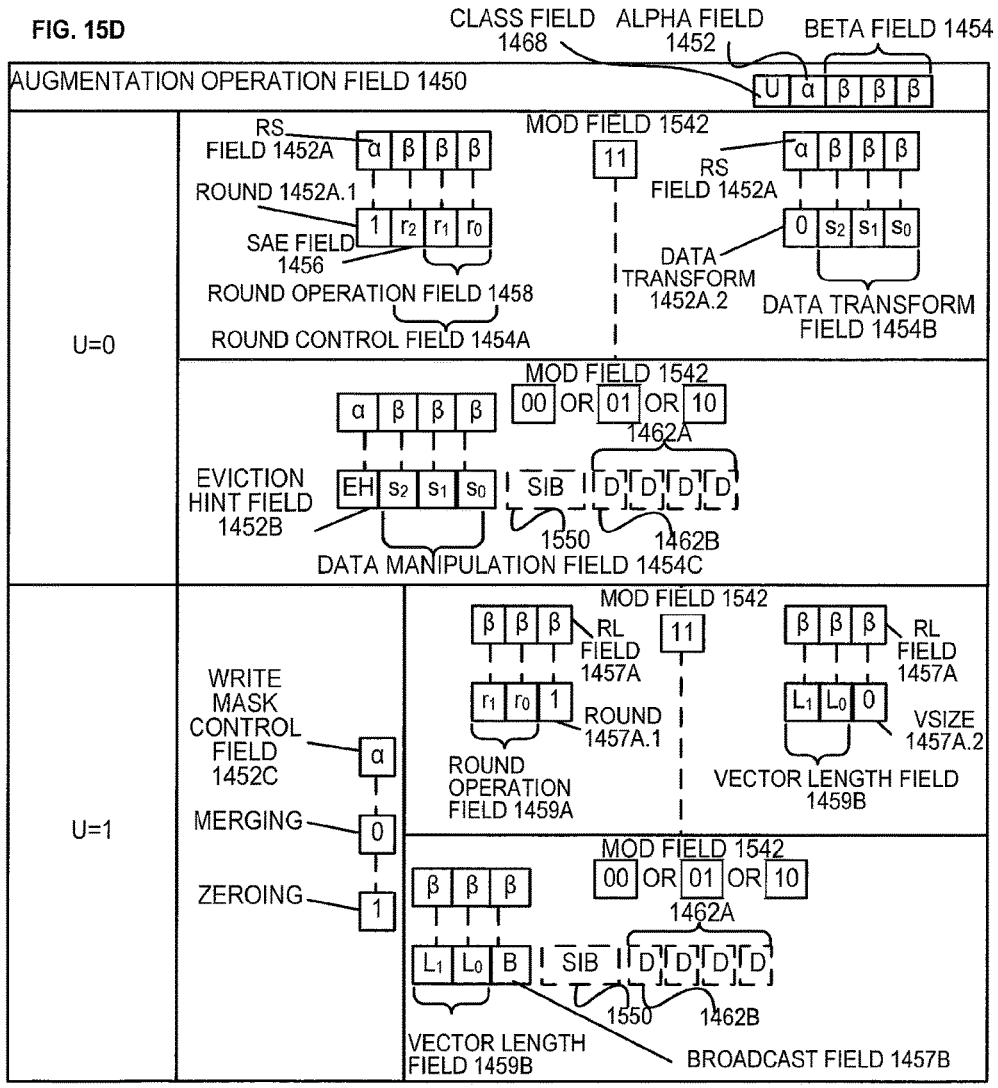
FIG. 15D is a block diagram illustrating the fields of the specific vector friendly instruction format that make up the augmentation operation field according to one embodiment of the invention.

FIG. 15D is a block diagram illustrating the fields of the specific vector friendly instruction format 1500 that make up the augmentation operation field 1450 according to one embodiment of the invention. When the class (U) field 1468 contains 0, it signifies EVEX.U0 (class A 1468A); when it contains 1, it signifies EVEX.U1 (class B 1468B). When U=0 and the MOD field 1542 contains 11 (signifying a no memory access operation), the alpha field 1452 (EVEX byte 3, bit [7]—EH) is interpreted as the rs field 1452A. When the rs field 1452A contains a 1 (round 1452A.1), the beta field 1454 (EVEX byte 3, bits [6:4]—SSS) is interpreted as the round control field 1454A. The round control field 1454A includes a one bit SAE field 1456 and a two bit round operation field 1458. When the rs field 1452A contains a 0 (data transform 1452A.2), the beta field 1454 (EVEX byte 3, bits [6:4]—SSS) is interpreted as a three bit data transform field 1454B. When U=0 and the MOD field 1542 contains 00, 01, or 10 (signifying a memory access operation), the alpha field 1452 (EVEX byte 3, bit [7]—EH) is interpreted as the eviction hint (EH) field 1452B and the beta field 1454 (EVEX byte 3, bits [6:4]—SSS) is interpreted as a three bit data manipulation field 1454C.

When U=1, the alpha field 1452 (EVEX byte 3, bit [7]—EH) is interpreted as the write mask control (Z) field 1452C. When U=1 and the MOD field 1542 contains 11 (signifying a no memory access operation), part of the beta field 1454 (EVEX byte 3, bit [4]—S$_0$) is interpreted as the RL field 1457A; when it contains a 1 (round 1457A.1) the rest of the beta field 1454 (EVEX byte 3, bit [6-5]—S$_{2-1}$) is interpreted as the round operation field 1459A, while when the RL field 1457A contains a 0 (VSIZE 1457.A2) the rest of the beta field 1454 (EVEX byte 3, bit [6-5]—S$_{2-1}$) is interpreted as the vector length field 1459B (EVEX byte 3, bit [6-5]—L$_{1-0}$). When U=1 and the MOD field 1542 contains 00, 01, or 10 (signifying a memory access operation), the beta field 1454 (EVEX byte 3, bits [6:4]—SSS) is interpreted as the vector length field 1459B (EVEX byte 3, bit [6-5]—L$_{1-0}$) and the broadcast field 1457B (EVEX byte 3, bit [4]—B).

Exemplary Encoding into the Specific Vector Friendly Instruction Format

Exemplary Register Architecture

FIG. 16 is a block diagram of a register architecture 1600 according to one embodiment of the invention. In the embodiment illustrated, there are 32 vector registers 1610 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1500 operates on these overlaid register file as illustrated in the below tables.

| Adjustable Vector Length | Class | Operations | Registers |
|---|---|---|---|
| Instruction Templates that do not include the vector length field 1459B | A (FIG. 14A; U = 0) | 1410, 1415, 1425, 1430 | zmm registers (the vector length is 64 byte) |
| | B (FIG. 14B; U = 1) | 1412 | zmm registers (the vector length is 64 byte) |
| Instruction Templates that do include the vector length field 1459B | B (FIG. 14B; U = 1) | 1417, 1427 | zmm, ymm, or xmm registers (the vector length is 64 byte, 32 byte, or 16 byte) depending on the vector length field 1459B |

In other words, the vector length field 1459B selects between a maximum length and one or more other shorter lengths, where each such shorter length is half the length of the preceding length; and instructions templates without the vector length field 1459B operate on the maximum vector length. Further, in one embodiment, the class B instruction templates of the specific vector friendly instruction format 1500 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1615—in the embodiment illustrated, there are 8 write mask registers (k0 through k7), each 64 bits in size. In an alternate embodiment, the write mask registers 1615 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1645, on which is aliased the MMX packed integer flat register file 1650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 17A is a block diagram illustrating both an exemplary in-order pipeline and an exemplary register renaming, out-of-order issue/execution pipeline according to embodiments of the invention. FIG. 17B is a block diagram illustrating both an exemplary embodiment of an in-order architecture core and an exemplary register renaming, out-of-order issue/execution architecture core to be included in a processor according to embodiments of the invention. The solid lined boxes in FIGS. 17A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 17A, a processor pipeline 1700 includes a fetch stage 1702, a length decode stage 1704, a decode stage 1706, an allocation stage 1708, a renaming stage 1710, a scheduling (also known as a dispatch or issue) stage 1712, a register read/memory read stage 1714, an execute stage 1716, a write back/memory write stage 1718, an exception handling stage 1722, and a commit stage 1724.

FIG. 17B shows processor core 1790 including a front end unit 1730 coupled to an execution engine unit 1750, and both are coupled to a memory unit 1770. The core 1790 may be a reduced instruction set computing (RISC) core, a complex instruction set computing (CISC) core, a very long instruction word (VLIW) core, or a hybrid or alternative core type. As yet another option, the core 1790 may be a special-purpose core, such as, for example, a network or communication core, compression engine, coprocessor core, general purpose computing graphics processing unit (GPGPU) core, graphics core, or the like.

The front end unit 1730 includes a branch prediction unit 1732 coupled to an instruction cache unit 1734, which is coupled to an instruction translation lookaside buffer (TLB) 1736, which is coupled to an instruction fetch unit 1738, which is coupled to a decode unit 1740. The decode unit 1740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1790 includes a microcode ROM or other medium that stores microcode for certain macroinstructions (e.g., in decode unit 1740 or otherwise within the front end unit 1730). The decode unit 1740 is coupled to a rename/allocator unit 1752 in the execution engine unit 1750.

The execution engine unit 1750 includes the rename/allocator unit 1752 coupled to a retirement unit 1754 and a set of one or more scheduler unit(s) 1756. The scheduler unit(s) 1756 represents any number of different schedulers, including reservations stations, central instruction window, etc. The scheduler unit(s) 1756 is coupled to the physical register file(s) unit(s) 1758. Each of the physical register file(s) units 1758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1758 comprises a vector registers unit, a write mask registers unit, and a scalar registers unit. These register units may provide architectural vector registers, vector mask registers, and general purpose registers. The physical register file(s) unit(s) 1758 is overlapped by the retirement unit 1754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1754 and the physical register file(s) unit(s) 1758 are coupled to the execution cluster(s) 1760. The execution cluster(s) 1760 includes a set of one or more execution units 1762 and a set of one or more memory access units 1764. The execution units 1762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1756, physical register file(s) unit(s) 1758, and execution cluster(s) 1760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1764). It should also be understood that where separate pipelines are used, one or more of these pipelines may be out-of-order issue/execution and the rest in-order.

The set of memory access units 1764 is coupled to the memory unit 1770, which includes a data TLB unit 1772 coupled to a data cache unit 1774 coupled to a level 2 (L2) cache unit 1776. In one exemplary embodiment, the memory access units 1764 may include a load unit, a store address unit, and a store data unit, each of which is coupled to the data TLB unit 1772 in the memory unit 1770. The instruction cache unit 1734 is further coupled to a level 2 (L2) cache unit 1776 in the memory unit 1770. The L2 cache unit 1776 is coupled to one or more other levels of cache and eventually to a main memory.

By way of example, the exemplary register renaming, out-of-order issue/execution core architecture may implement the pipeline 1700 as follows: 1) the instruction fetch 1738 performs the fetch and length decoding stages 1702 and 1704; 2) the decode unit 1740 performs the decode stage 1706; 3) the rename/allocator unit 1752 performs the allocation stage 1708 and renaming stage 1710; 4) the scheduler unit(s) 1756 performs the schedule stage 1712; 5) the physical register file(s) unit(s) 1758 and the memory unit 1770 perform the register read/memory read stage 1714; the execution cluster 1760 perform the execute stage 1716; 6) the memory unit 1770 and the physical register file(s) unit(s) 1758 perform the write back/memory write stage 1718; 7) various units may be involved in the exception handling stage 1722; and 8) the retirement unit 1754 and the physical register file(s) unit(s) 1758 perform the commit stage 1724.

The core 1790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1790 includes logic to support a packed data instruction set extension (e.g., AVX1, AVX2, and/or some form of the generic vector friendly instruction format (U=0 and/or U=1) previously described), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1734/1774 and a shared L2 cache unit 1776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 18A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 18A is a block diagram of a single processor core, along with its connection to the on-die interconnect network 1802 and with its local subset of the Level 2 (L2) cache 1804, according to embodiments of the invention. In one embodiment, an instruction decoder 1800 supports the x86 instruction set with a packed data instruction set extension. An L1 cache 1806 allows low-latency accesses to cache memory into the scalar and vector units. While in one embodiment (to simplify the design), a scalar unit 1808 and a vector unit 1810 use separate register sets (respectively, scalar registers 1812 and vector registers 1814) and data transferred between them is written to memory and then read back in from a level 1 (L1) cache 1806, alternative embodiments of the invention may use a different approach (e.g., use a single register set or include a communication path that allow data to be transferred between the two register files without being written and read back).

The local subset of the L2 cache 1804 is part of a global L2 cache that is divided into separate local subsets, one per processor core. Each processor core has a direct access path to its own local subset of the L2 cache 1804. Data read by a processor core is stored in its L2 cache subset 1804 and can be accessed quickly, in parallel with other processor cores accessing their own local L2 cache subsets. Data written by a processor core is stored in its own L2 cache subset 1804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 18B is an expanded view of part of the processor core in FIG. 18A according to embodiments of the invention. FIG. 18B includes an L1 data cache 1806A part of the L1 cache 1804, as well as more detail regarding the vector unit 1810 and the vector registers 1814. Specifically, the vector unit 1810 is a 16-wide vector processing unit (VPU) (see the 16-wide ALU 1828), which executes one or more of integer, single-precision float, and double-precision float instructions. The VPU supports swizzling the register inputs with swizzle unit 1820, numeric conversion with numeric convert units 1822A-B, and replication with replication unit 1824 on the memory input. Write mask registers 1826 allow predicating resulting vector writes.

Processor with Integrated Memory Controller and Graphics

Figure 19:
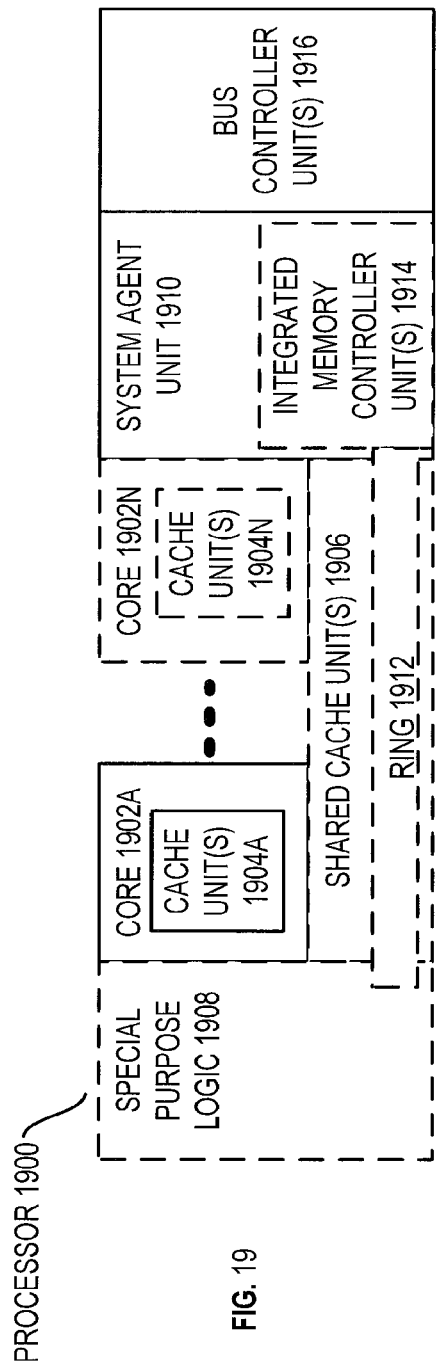
FIG. 19 is a block diagram of a processor that may have more than one core, may have an integrated memory controller, and may have integrated graphics according to embodiments of the invention.

FIG. 19 is a block diagram of a processor 1900 that may have more than one core, may have an integrated memory controller, and may have integrated graphics according to embodiments of the invention. The solid lined boxes in FIG. 19 illustrate a processor 1900 with a single core 1902A, a system agent 1910, a set of one or more bus controller units 1916, while the optional addition of the dashed lined boxes illustrates an alternative processor 1900 with multiple cores 1902A-N, a set of one or more integrated memory controller unit(s) 1914 in the system agent unit 1910, and special purpose logic 1908.

Thus, different implementations of the processor 1900 may include: 1) a CPU with the special purpose logic 1908 being integrated graphics and/or scientific (throughput) logic (which may include one or more cores), and the cores 1902A-N being one or more general purpose cores (e.g., general purpose in-order cores, general purpose out-of-order cores, a combination of the two); 2) a coprocessor with the cores 1902A-N being a large number of special purpose cores intended primarily for graphics and/or scientific (throughput); and 3) a coprocessor with the cores 1902A-N being a large number of general purpose in-order cores. Thus, the processor 1900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1906, and external memory (not shown) coupled to the set of integrated memory controller units 1914. The set of shared cache units 1906 may include one or more mid-level caches, such as level 2 (L2), level 3 (L3), level 4 (L4), or other levels of cache, a last level cache (LLC), and/or combinations thereof. While in one embodiment a ring based interconnect unit 1912 interconnects the integrated graphics logic 1908, the set of shared cache units 1906, and the system agent unit 1910/integrated memory controller unit(s) 1914, alternative embodiments may use any number of well-known techniques for interconnecting such units. In one embodiment, coherency is maintained between one or more cache units 1906 and cores 1902-A-N.

In some embodiments, one or more of the cores 1902A-N are capable of multi-threading. The system agent 1910 includes those components coordinating and operating cores 1902A-N. The system agent unit 1910 may include for example a power control unit (PCU) and a display unit. The PCU may be or include logic and components needed for regulating the power state of the cores 1902A-N and the integrated graphics logic 1908. The display unit is for driving one or more externally connected displays.

The cores 1902A-N may be homogenous or heterogeneous in terms of architecture instruction set; that is, two or more of the cores 1902A-N may be capable of execution the same instruction set, while others may be capable of executing only a subset of that instruction set or a different instruction set.

Exemplary Computer Architectures

FIGS. 20-23 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 20:
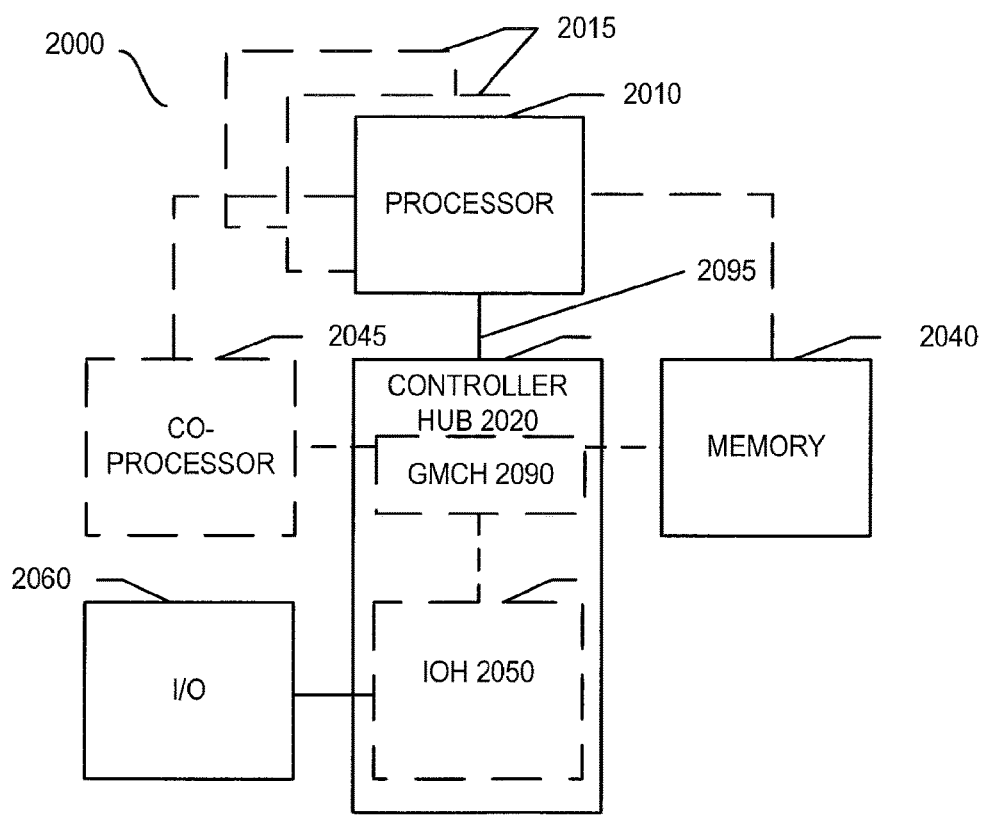
FIG. 20 is a block diagram of a system in accordance with one embodiment of the present invention.

Referring now to FIG. 20, shown is a block diagram of a system 2000 in accordance with one embodiment of the present invention. The system 2000 may include one or more processors 2010, 2015, which are coupled to a controller hub 2020. In one embodiment the controller hub 2020 includes a graphics memory controller hub (GMCH) 2090 and an Input/Output Hub (IOH) 2050 (which may be on separate chips); the GMCH 2090 includes memory and graphics controllers to which are coupled memory 2040 and a coprocessor 2045; the IOH 2050 is couples input/output (I/O) devices 2060 to the GMCH 2090. Alternatively, one or both of the memory and graphics controllers are integrated within the processor (as described herein), the memory 2040 and the coprocessor 2045 are coupled directly to the processor 2010, and the controller hub 2020 in a single chip with the IOH 2050.

The optional nature of additional processors 2015 is denoted in FIG. 20 with broken lines. Each processor 2010, 2015 may include one or more of the processing cores described herein and may be some version of the processor 1900.

The memory 2040 may be, for example, dynamic random access memory (DRAM), phase change memory (PCM), or a combination of the two. For at least one embodiment, the controller hub 2020 communicates with the processor(s) 2010, 2015 via a multi-drop bus, such as a frontside bus (FSB), point-to-point interface such as QuickPath Interconnect (QPI), or similar connection 2095.

In one embodiment, the coprocessor 2045 is a special-purpose processor, such as, for example, a high-throughput MIC processor, a network or communication processor, compression engine, graphics processor, GPGPU, embedded processor, or the like. In one embodiment, controller hub 2020 may include an integrated graphics accelerator.

There can be a variety of differences between the physical resources 2010, 2015 in terms of a spectrum of metrics of merit including architectural, microarchitectural, thermal, power consumption characteristics, and the like.

In one embodiment, the processor 2010 executes instructions that control data processing operations of a general type. Embedded within the instructions may be coprocessor instructions. The processor 2010 recognizes these coprocessor instructions as being of a type that should be executed by the attached coprocessor 2045. Accordingly, the processor 2010 issues these coprocessor instructions (or control signals representing coprocessor instructions) on a coprocessor bus or other interconnect, to coprocessor 2045. Coprocessor(s) 2045 accept and execute the received coprocessor instructions.

Figure 21:
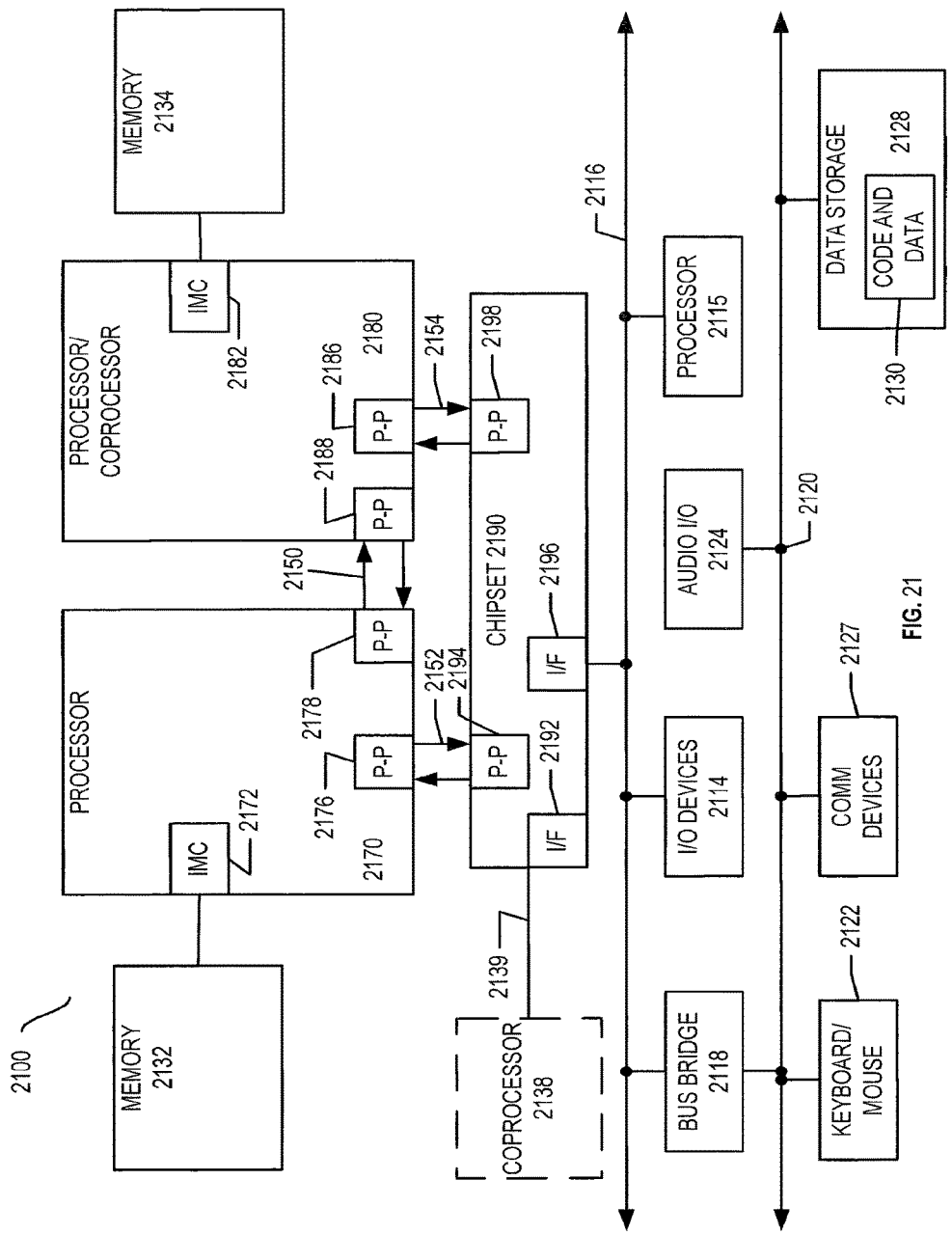
FIG. 21 is a block diagram of a first more specific exemplary system in accordance with an embodiment of the present invention.

Referring now to FIG. 21, shown is a block diagram of a first more specific exemplary system 2100 in accordance with an embodiment of the present invention. As shown in FIG. 21, multiprocessor system 2100 is a point-to-point interconnect system, and includes a first processor 2170 and a second processor 2180 coupled via a point-to-point interconnect 2150. Each of processors 2170 and 2180 may be some version of the processor 1900. In one embodiment of the invention, processors 2170 and 2180 are respectively processors 2010 and 2015, while coprocessor 2138 is coprocessor 2045. In another embodiment, processors 2170 and 2180 are respectively processor 2010 coprocessor 2045.

Processors 2170 and 2180 are shown including integrated memory controller (IMC) units 2172 and 2182, respectively. Processor 2170 also includes as part of its bus controller units point-to-point (P-P) interfaces 2176 and 2178; similarly, second processor 2180 includes P-P interfaces 2186 and 2188. Processors 2170, 2180 may exchange information via a point-to-point (P-P) interface 2150 using P-P interface circuits 2178, 2188. As shown in FIG. 21, IMCs 2172 and 2182 couple the processors to respective memories, namely a memory 2132 and a memory 2134, which may be portions of main memory locally attached to the respective processors.

Processors 2170, 2180 may each exchange information with a chipset 2190 via individual P-P interfaces 2152, 2154 using point to point interface circuits 2176, 2194, 2186, 2198. Chipset 2190 may optionally exchange information with the coprocessor 2138 via a high-performance interface 2139. In one embodiment, the coprocessor 2138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2190 may be coupled to a first bus 2116 via an interface 2196. In one embodiment, first bus 2116 may be a Peripheral Component Interconnect (PCI) bus, or a bus such as a PCI Express bus or another third generation I/O interconnect bus, although the scope of the present invention is not so limited.

As shown in FIG. 21, various I/O devices 2114 may be coupled to first bus 2116, along with a bus bridge 2118 which couples first bus 2116 to a second bus 2120. In one embodiment, one or more additional processor(s) 2115, such as coprocessors, high-throughput MIC processors, GPG-PU's, accelerators (such as, e.g., graphics accelerators or digital signal processing (DSP) units), field programmable gate arrays, or any other processor, are coupled to first bus 2116. In one embodiment, second bus 2120 may be a low pin count (LPC) bus. Various devices may be coupled to a second bus 2120 including, for example, a keyboard and/or mouse 2122, communication devices 2127 and a storage unit 2128 such as a disk drive or other mass storage device which may include instructions/code and data 2130, in one embodiment. Further, an audio I/O 2124 may be coupled to the second bus 2120. Note that other architectures are possible. For example, instead of the point-to-point architecture of FIG. 21, a system may implement a multi-drop bus or other such architecture.

Figure 22:
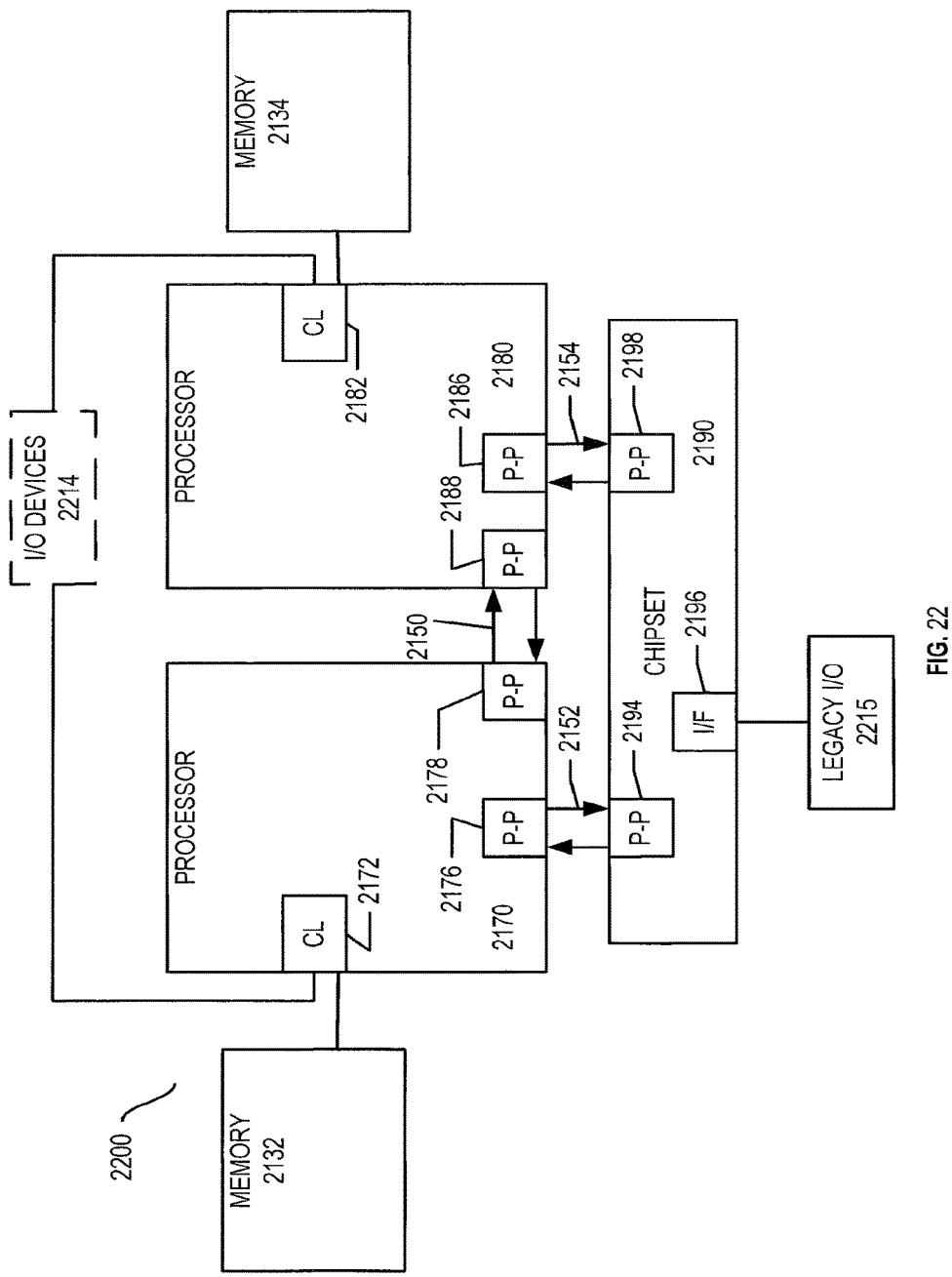
FIG. 22 is a block diagram of a second more specific exemplary system in accordance with an embodiment of the present invention.

Referring now to FIG. 22, shown is a block diagram of a second more specific exemplary system 2200 in accordance with an embodiment of the present invention. Like elements in FIGS. 21 and 22 bear like reference numerals, and certain aspects of FIG. 21 have been omitted from FIG. 22 in order to avoid obscuring other aspects of FIG. 22.

FIG. 22 illustrates that the processors 2170, 2180 may include integrated memory and I/O control logic ("CL") 2172 and 2182, respectively. Thus, the CL 2172, 2182 include integrated memory controller units and include I/O control logic. FIG. 22 illustrates that not only are the memories 2132, 2134 coupled to the CL 2172, 2182, but also that I/O devices 2214 are also coupled to the control logic 2172, 2182. Legacy I/O devices 2215 are coupled to the chipset 2190.

Figure 23:
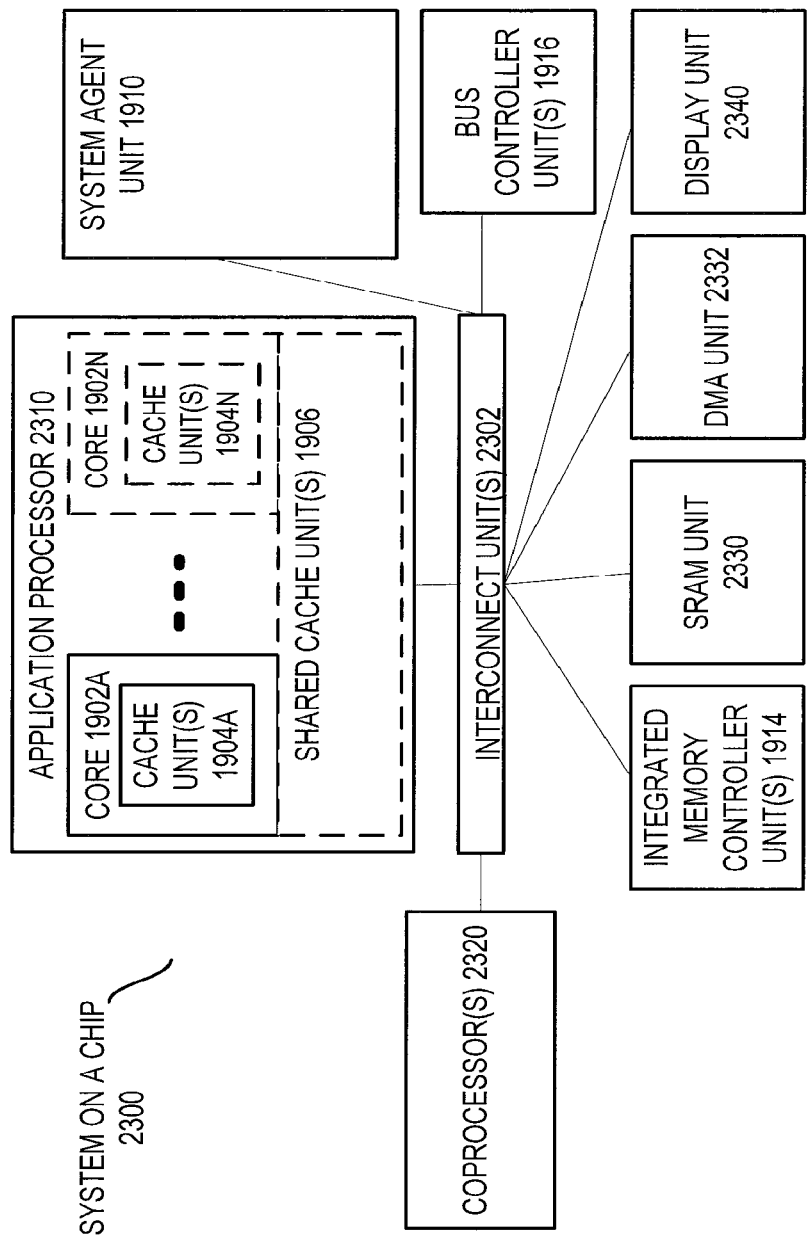
FIG. 23 is a block diagram of a SoC in accordance with an embodiment of the present invention.

Referring now to FIG. 23, shown is a block diagram of a SoC 2300 in accordance with an embodiment of the present invention. Similar elements in FIG. 19 bear like reference numerals. Also, dashed lined boxes are optional features on more advanced SoCs. In FIG. 23, an interconnect unit(s) 2302 is coupled to: an application processor 2310 which includes a set of one or more cores 202A-N and shared cache unit(s) 1906; a system agent unit 1910; a bus controller unit(s) 1916; an integrated memory controller unit(s) 1914; a set or one or more coprocessors 2320 which may include integrated graphics logic, an image processor, an audio processor, and a video processor; an static random access memory (SRAM) unit 2330; a direct memory access (DMA) unit 2332; and a display unit 2340 for coupling to one or more external displays. In one embodiment, the coprocessor(s) 2320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2130 illustrated in FIG. 21, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 24 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 24 shows a program in a high level language 2402 may be compiled using an x86 compiler 2404 to generate x86 binary code 2406 that may be natively executed by a processor with at least one x86 instruction set core 2416. The processor with at least one x86 instruction set core 2416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2404 represents a compiler that is operable to generate x86 binary code 2406 (e.g., object code) that can, with or without additional linkage processing, be executed on the processor with at least one x86 instruction set core 2416. Similarly, FIG. 24 shows the program in the high level language 2402 may be compiled using an alternative instruction set compiler 2408 to generate alternative instruction set binary code 2410 that may be natively executed by a processor without at least one x86 instruction set core 2414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2412 is used to convert the x86 binary code 2406 into code that may be natively executed by the processor without an x86 instruction set core 2414. This converted code is not likely to be the same as the alternative instruction set binary code 2410 because an instruction converter capable of this is difficult to make; however, the converted code will accomplish the general operation and be made up of instructions from the alternative instruction set. Thus, the instruction converter 2412 represents software, firmware, hardware, or a combination thereof that, through emulation, simulation or any other process, allows a processor or other electronic device that does not have an x86 instruction set processor or core to execute the x86 binary code 2406.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below.

What is claimed is:

1. A method of performing an instruction in a computer processor, comprising:

fetching the instruction that includes a source operand and a destination operand, wherein the source operand specifies a source vector register included in the computer processor that includes a plurality of source data elements that are to be scattered to a plurality of destination vector registers included in the computer processor, wherein the destination operand identifies a first plurality of destination data elements, wherein each of the destination data elements specifies a destination vector register included in the computer processor out of the plurality of destination vector registers included in the computer processor and an index position into that destination vector register included in the computer processor;

decoding the fetched instruction; and executing the decoded instruction causing, for each of the first plurality of destination data elements, storage of the one of the source data elements that is in a position in the source vector register that corresponds with a position of that destination data element in the destination vector register included in the computer processor at the index position specified by that destination data element.

2. The method of claim 1, wherein the destination operand specifies a vector register that identifies the first plurality of destination data elements.

3. The method of claim 2, wherein the vector register specified by the destination operand includes a second plurality of destination data elements that includes the first plurality of destination data elements and at least one destination data element that indicates that the one of the source data elements that is in a position in the source vector register that corresponds with that destination data element is not to be stored in a destination vector register as a result of executing the decoded multi-register scatter instruction.

4. The method of claim 2, wherein the source vector register and the vector register specified by the destination operand are each 512-bits.

5. The method of claim 4, wherein each of the first plurality of destination data elements is 32-bits of which 8 bits indicate a destination vector register and 8 bits indicate an index into that destination vector register.

6. The method of claim 1, wherein the destination operand specifies a memory location that identifies the first plurality of destination data elements.

7. The method of claim 1, wherein the source vector register is 512-bits.

8. A processor core, comprising:
a hardware decode unit to decode an instruction, wherein the instruction includes a source operand and a destination operand, wherein the source operand specifies a source vector register that includes a plurality of source data elements that are to be scattered to a plurality of destination vector registers, wherein the destination operand identifies a first plurality of destination data elements, wherein each of the destination data elements specifies a destination vector register out of the plurality of destination vector registers and an index into that destination vector register; and
an execution engine unit to execute the decoded instruction which causes, for each of the first plurality of destination data elements, to store the one of the source data elements that is in a position in the source vector register that corresponds with a position of that destination data element to be stored in the destination vector register at the index specified by that destination data element.

9. The processor core of claim 8, wherein the destination operand specifies a vector register that identifies the first plurality of destination data elements.

10. The processor core of claim 9, wherein the vector register specified by the destination operand includes a second plurality of destination data elements that includes the first plurality of destination data elements and at least one destination data element that indicates that the one of the source data elements that is in a position in the source vector register that corresponds with that destination data element is not to be stored in a destination vector register as a result of executing the decoded multi-register scatter instruction.

11. The processor core of claim 9, wherein the source vector register and the vector register specified by the destination operand are each 512-bits.

12. The processor core of claim 11, wherein each of the first plurality of destination data elements is 32-bits of which 8 bits indicate a destination vector register and 8 bits indicate an index into that destination vector register.

13. The processor core of claim 8, wherein the destination operand specifies a memory location that identifies the first plurality of destination data elements.

14. The processor core of claim 8, wherein the source vector register is 512-bits.

15. An article of manufacture, comprising:
a non-transitory tangible machine-readable storage medium having stored thereon an instruction, wherein the includes a source operand and a destination operand, wherein the source operand specifies a source vector register that includes a plurality of source data elements that are to be scattered to a plurality of destination vector registers, wherein the destination operand identifies a first plurality of destination data elements, wherein each of the destination data elements specifies a destination vector register out of the plurality of destination vector registers and an index into that destination vector register; and
wherein the includes an opcode, which instructs a machine to execute the instruction that causes, for each of the first plurality of destination data elements, storage of the one of the source data elements that is in a position in the source vector register that corresponds with a position of that destination data element to be stored in the destination vector register at the index specified by that destination data element.

16. The article of manufacture of claim 15, wherein the destination operand specifies a vector register that identifies the first plurality of destination data elements.

17. The article of manufacture of claim 16, wherein the vector register specified by the destination operand includes a second plurality of destination data elements that includes the first plurality of destination data elements and at least one destination data element that indicates that the one of the source data elements that is in a position in the source vector register that corresponds with that destination data element is not to be stored in a destination vector register as a result of executing the decoded multi-register scatter instruction.

18. The article of manufacture of claim 16, wherein the source vector register and the vector register specified by the destination operand are each 512-bits, and the size of the data elements is defined by the instruction.

19. The article of manufacture of claim 18, wherein each of the first plurality of destination data elements is 32-bits of which 8 bits indicate a destination vector register and 8 bits indicate an index into that destination vector register.

20. The article of manufacture of claim 15, wherein the destination operand specifies a memory location that identifies the first plurality of destination data elements.

* * * * *